United States Patent
Tanaka et al.

(10) Patent No.: US 11,984,660 B2
(45) Date of Patent: May 14, 2024

(54) ADAPTIVE CONTROL DEVICE, ADAPTIVE SIGNAL PROCESSING DEVICE, AND ADAPTIVE ARRAY ANTENNA SYSTEM

(71) Applicant: Mitsubishi Electric Corporation, Tokyo (JP)

(72) Inventors: Yuji Tanaka, Tokyo (JP); Yoshiki Takahashi, Tokyo (JP); Ryuhei Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 358 days.

(21) Appl. No.: 17/560,918

(22) Filed: Dec. 23, 2021

(65) Prior Publication Data

US 2022/0115781 A1  Apr. 14, 2022

Related U.S. Application Data

(63) Continuation of application No. PCT/JP2019/032982, filed on Aug. 23, 2019.

(51) Int. Cl.
| | |
|---|---|
| H01Q 7/06 | (2006.01) |
| H01Q 3/26 | (2006.01) |
| H01Q 3/40 | (2006.01) |
| H04B 7/06 | (2006.01) |
| H04B 7/08 | (2006.01) |

(52) U.S. Cl.
CPC ............ *H01Q 3/2611* (2013.01); *H01Q 3/40* (2013.01); *H04B 7/0617* (2013.01); *H04B 7/086* (2013.01)

(58) Field of Classification Search
CPC ...... H01Q 3/2622; H01Q 3/40; H04B 7/0617; H04B 7/086

USPC .......................................................... 342/373
See application file for complete search history.

(56) References Cited

FOREIGN PATENT DOCUMENTS

| CN | 109361443 A | * | 2/2019 | ........... H04B 7/0617 |
|---|---|---|---|---|
| CN | 111628790 A | * | 9/2020 | ............. G01S 19/21 |
| DE | 60019359 T2 | * | 2/2006 | ........... A61G 17/004 |

OTHER PUBLICATIONS

Kogon, Stephen M., "Eigenvectors, Diagonal Loading and White Noise Gain Constraints for Robust Adaptive Beamforming," The Thirty-Seventh Asilomar Conference on Signals, Systems and Computers, Pacific Grove, vol. 2, 2003, pp. 1853-1857.

(Continued)

*Primary Examiner* — Harry K Liu
(74) *Attorney, Agent, or Firm* — Birch, Stewart, Kolasch & Birch, LLP

(57) ABSTRACT

An adaptive array antenna system receives a desired wave arriving through K time slots each allocated to one of K transmitting stations. In the adaptive array antenna system, an adaptive control device includes a correlation matrix calculating unit, a correlation matrix storing unit, an inverse matrix calculating unit, and a weighting factor calculating unit. The inverse matrix calculating unit acquires a correlation matrix having been calculated at previous time for another time slot other than the current time slot from the correlation matrix storing unit, regards the acquired correlation matrix as an interference noise correlation matrix, and calculates an inverse matrix of the interference noise correlation matrix. The weighting factor calculating unit calculates values of a plurality of weighting factors used by a beamforming unit using the inverse matrix.

13 Claims, 15 Drawing Sheets

(56) References Cited

OTHER PUBLICATIONS

Shahbazpanahi et al., "Robust Adaptive Beamforming for General-Rank Signal Models," IEEE Transactions on Signal Processing, vol. 51, No. 9. Sep. 2003, pp. 2257-2269.
Van Trees, Harry L., "Optimum Array Processing: Part IV of Detection, Estimation, and Modulation Theory," New York: Wiley Interscience, 2002, pp. 728-729.

* cited by examiner

US 11,984,660 B2

ADAPTIVE CONTROL DEVICE, ADAPTIVE SIGNAL PROCESSING DEVICE, AND ADAPTIVE ARRAY ANTENNA SYSTEM

CROSS REFERENCE TO RELATED APPLICATIONS

This application is a Continuation of PCT International Application No. PCT/JP2019/032982, filed on Aug. 23, 2019, which is hereby expressly incorporated by reference into the present application.

TECHNICAL FIELD

The present invention relates to adaptive array antenna technology for adaptively controlling directivity of an antenna array.

BACKGROUND ART

Typically, adaptive array antennas have a beamforming function of generating a plurality of weighted signals by weighting each of a plurality of reception signals obtained from a plurality of antenna elements with a weighting factor (adaptive weight) and combing the weighted signals. The beamforming function makes it possible to suppress undesirable signal components such as an interference wave component or a noise component and to acquire desired wave components at a high signal-to-interference-plus-noise power ratio (SINR). A specific method of such a beamforming function is disclosed in, for example, Non-Patent Literature 1 below.

Non-Patent Literature 1 discloses two types of beamforming technology called minimum variance and distortionless response (MVDR) beamforming and minimum power and distortionless response (MPDR) beamforming.

The MVDR beamforming is a method of obtaining a weighting factor that maximizes the SINR under predetermined constraint conditions using a correlation matrix (hereinafter also referred to as "interference noise correlation matrix") calculated from an interference wave component and a noise component in a reception signal and a steering vector in a direction of arrival of a desired wave. However, in an environment in which a desired wave is received, it is difficult to accurately estimate the interference noise correlation matrix. Thus, in the MPDR beamforming, a correlation matrix calculated from a plurality of reception signals (signal including a desired wave component, an interference wave component, and a noise component) obtained from a plurality of antenna elements is used instead of the interference noise correlation matrix. The MPDR beamforming is a method of obtaining a weighting factor that maximizes the SINR under a predetermined constraint condition using the correlation matrix and the steering vector in the direction of arrival of a desired wave.

When the MVDR beamforming or the MPDR beamforming is implemented, a correlation matrix is often calculated on the basis of a method called sample matrix inversion (SMI).

CITATION LIST

Non-Patent Literature

Non Patent Literature 1: Van Trees, H. L., "Optimum Array Processing: Part IV of Detection, Estimation, and Modulation Theory", New York: Wiley Interscience, 2002. (See, for example, pp. 728 to 729.)

SUMMARY OF INVENTION

Technical Problem

In the MVDR beamforming and the MPDR beamforming described above, the SINR decreases when an error occurs in the steering vector in the assumed direction of arrival of a desired wave; however, the robustness against the error of the steering vector is higher in the MVDR beamforming than in the MPDR beamforming. Thus, even in a case where an error occurs in the steering vector, the MVDR beamforming can suppress deterioration of the communication quality more than the MPDR beamforming can.

However, the MVDR beamforming has a disadvantage that a communication throughput decreases since it is necessary to provide a time period in which the desired wave is not received in order to calculate the interference noise correlation matrix.

In view of the above, an object of the present invention is to provide an adaptive control device, an adaptive signal processing device, and an adaptive array antenna system capable of performing beamforming while suppressing deterioration of the communication quality without reducing the communication throughput even when an error occurs in the steering vector in an assumed direction of arrival of a desired wave.

Solution to Problem

An adaptive control device according to one aspect of the present invention is An adaptive control device to adaptively control directivity of an antenna array in an adaptive array antenna system including: an antenna array including a plurality of antenna elements to receive a desired wave arriving through K time slots each allocated to one of K transmitting stations (K is an integer greater than or equal to 2); a reception circuit to generate a plurality of reception signals by performing signal processing on a plurality of antenna signals output in parallel from the plurality of respective antenna elements; and a beamformer to generate a plurality of weighted signals by weighting the plurality of reception signals with each of a plurality of weighting factors and generate a combined signal by combining the plurality of weighted signals, the adaptive control device comprising: processing circuitry configured to calculate a correlation matrix of the plurality of reception signals for each of the K time slots; store the correlation matrix that has been calculated; in a case where the antenna array receives a desired wave through a current time slot that is any one of the K time slots at current time, acquire a correlation matrix that has been calculated at previous time for another time slot other than the current time slot among the K time slots, regard the acquired correlation matrix as an interference noise correlation matrix, and calculate an inverse matrix of the interference noise correlation matrix; and calculate the plurality of weighting factors using the inverse matrix.

Advantageous Effects of Invention

According to an aspect of the present invention, a correlation matrix calculated at previous time at another time slot other than the current time slot is regarded as an interference noise correlation matrix, and values of a plurality of weighting factors are calculated by using an inverse matrix of the interference noise correlation matrix. Therefore, even when an error occurs in the steering vector in an assumed direction of arrival of a desired wave at the current time, it is possible to perform beamforming while suppressing deterioration of the communication quality without reducing the communication throughput.

DESCRIPTION OF EMBODIMENTS

Hereinafter, various embodiments of the present invention will be described in detail with reference to the drawings. Note that components denoted by the same symbol throughout the drawings have the same configuration and the same function.

First Embodiment

Figure 1:
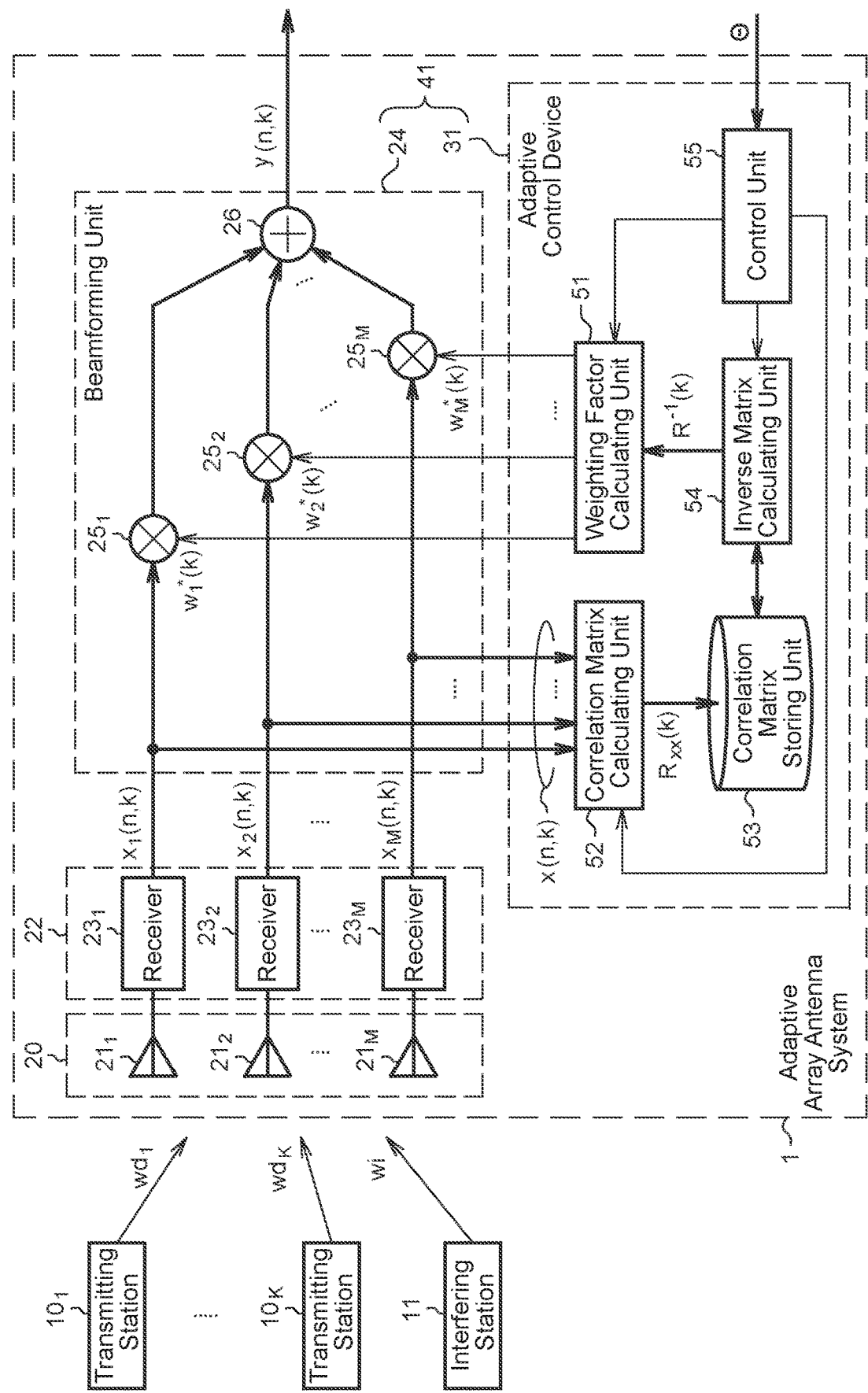
FIG. 1 is a diagram illustrating a schematic configuration of an adaptive array antenna system according to a first embodiment of the present invention.

FIG. 1 is a diagram illustrating a schematic configuration of an adaptive array antenna system 1 according to a first embodiment of the present invention. The adaptive array antenna system 1 illustrated in FIG. 1 is configured to receive desired waves $wd_1, \ldots, wd_K$ arriving through K time slots $Ts(1), \ldots, Ts(K)$ allocated to K transmitting stations $10_1, \ldots, 10_K$, respectively, in accordance with a time division multiple access (TDMA) scheme. Here, K is an integer greater or equal to 2 indicating the number of time slots $Ts(1)$ to $Ts(K)$. Examples of frequency bands used by the transmitting stations $10_1$ to $10_K$ include a microwave band and a millimeter wave band but are not limited thereto.

Figure 2:
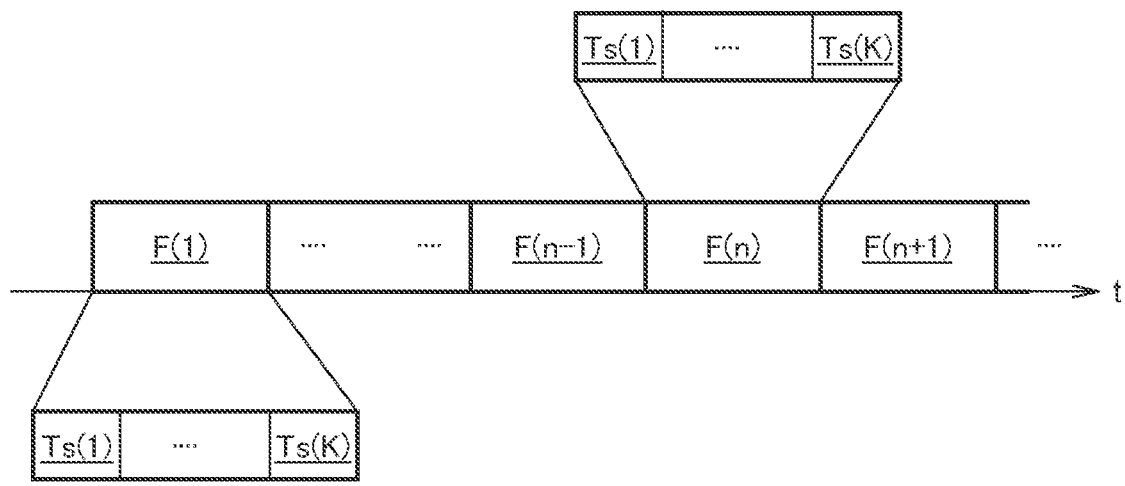
FIG. 2 is a diagram conceptually illustrating an example of time slots.

FIG. 2 is a diagram conceptually illustrating an example of time slots $Ts(1), \ldots, Ts(K)$. As illustrated in FIG. 2, the communication time is divided among a series of frames $F(1), \ldots, F(n-1), F(n), F(n+1), \ldots$. Here, n is an integer indicating a frame number. Each frame is further divided into K time slots $Ts(1), \ldots, Ts(K)$ on a time axis t. The k-th transmitting station $10_k$ can transmit the desired wave $wd_k$ only through the time slots $Ts(k)$ having the same number k that cyclically appear in the series of frames $F(1), F(2), F(3), \ldots$.

Referring to FIG. 1, the adaptive array antenna system 1 includes an antenna array 20 including M antenna elements $21_1, 21_2, \ldots, 21_M$ spatially arrayed. It is only required that the antenna elements $21_1, 21_2, \ldots, 21_M$ be arrayed in a linear, planar, or curved surface shape, for example. The antenna array 20 as such receives the desired waves $wd_1$ to $wd_K$ arriving in a time division manner from the transmitting stations $10_1$ to $10_K$ and also receives an interference wave wi constantly generated in an interfering station 11. The direction of arrival of the desired waves $wd_1$ to $wd_K$ to the antenna array 20 is given to the adaptive array antenna system 1 as known information. Hereinafter, such a known direction of arrival is referred to as "assumed direction of arrival".

The adaptive array antenna system 1 further includes a reception circuit 22 that performs an RF signal process on antenna signals output in parallel from the antenna elements $21_1, 21_2, \ldots, 21_M$. The reception circuit 22 includes receivers $23_1, 23_2, \ldots, 23_M$ connected to output terminals of the antenna elements $21_1, 21_2, \ldots, 21_M$, respectively.

The m-th receiver $23_m$ generates an analog signal by applying signal processing such as low noise amplification, filtering, and frequency conversion to an antenna signal output from the antenna element $21_m$ and generates a digital signal by applying A/D conversion to the analog signal. The m-th receiver $23_m$ further performs orthogonal detection on the digital signal to generate a reception signal $x_m(n, k)$. Here, n is an integer indicating a frame number, and k is an integer within a range of 1 to K indicating a time slot number. The reception signal $x_m(n, k)$ is a complex digital signal having an in-phase component and a quadrature-phase component.

A combination of M reception signals $x_1(n, k)$ to $x_M(n, k)$ can be expressed as a reception signal vector $x(n, k)$ of M dimensions (M rows and one column) as expressed by the following equation (1).

$$x(n, k) = [x_1(n, k), \ldots, x_M(n, k)]^T \qquad (1)$$

Here, a superscript "T" indicates transposition.

In a case where a desired wave is transmitted through a time slot Ts(k) in a frame F(n) at certain time, a reception signal vector x(n, k) is expressed by the following equation (2).

$$x(n, k) = s_d(n, k)a(\theta_k) + u(n, k)a(\theta_u) + N(n, k) \qquad (2)$$

In equation (2), $a(\theta_k)$ represents a steering vector in an assumed direction of arrival $\theta_k$ of a desired wave $wd_m$, $s_d(n, k)$ represents a complex amplitude of a desired wave component, $a(\theta_u)$ represents a steering vector in the assumed direction of arrival $\theta_u$ of an interference wave wi, u(n, k) represents a complex amplitude of an interference wave component, and N(n, k) represents a thermal noise vector. Note that, in the present embodiment, only one interference wave arrives at the antenna array 20 for convenience of description, but it is not limited thereto. Also, in cases where a plurality of interference waves arrives at the antenna array 20, similar description can be given.

Referring to FIG. 1, the adaptive array antenna system 1 includes a beamforming unit 24 and an adaptive control device 31 that provides weighting factors $w_1^*(k)$, $w_2^*(k)$, ..., $w_M^*(k)$ to the beamforming unit 24. Here, a superscript "*" indicates a complex conjugate. An adaptive signal processing device 41 of the present embodiment includes the beamforming unit 24 and the adaptive control device 31.

The beamforming unit 24 includes multipliers $25_1$, $25_2$, ..., $25_M$ that multiply (weight) the reception signals $x_1(n, k)$, $x_2(n, k)$, ..., $x_M(n, k)$ by the weighting factors $w_1^*(k)$, $w_2^*(k)$, ..., $w_M^*(k)$, respectively, to generate weighted signals for the M channels and a combiner 26 that combines the weighted signals to generate a combined signal y(n, k). By multiplying (weighting) the reception signals $x_1(n, k)$ to $x_M(n, k)$ by the weighting factors $w_1^*(k)$ to $w_M^*(k)$, it is possible to suppress undesirable signal components arriving from directions other than the assumed direction of arrival of a desired wave arriving at the current time.

A combination of complex conjugates $w_1(k)$ to $w_M(k)$ of the weighting factors $w_1^*(k)$ to $w_M^*(k)$ can be expressed as a vector w(k) of M dimensions (M rows and one column) as expressed by the following equation (3).

$$w(k) = [w_1(k), \ldots, w_M(k)]^T \qquad (3)$$

The combined signal y(n, k) is expressed by the following equations (4).

$$y(n, k) = w^H(k)x(n, k) = \sum_{m=1}^{M} w_m^*(k)x_m(n, k) \qquad (4)$$

Here, a superscript "H" indicates a Hermitian conjugate (transposition and complex conjugate).

Next, the configuration and the operation of the adaptive control device 31 according to the first embodiment will be described.

The adaptive control device 31 has a function of adaptively controlling the directivity of the antenna array 20 on the basis of the reception signals $x_1(n, k)$ to $x_M(n, k)$. As illustrated in FIG. 1, the adaptive control device 31 includes a weighting factor calculating unit 51, a correlation matrix calculating unit 52, a correlation matrix storing unit 53, an inverse matrix calculating unit 54, and a control unit 55. The control unit 55 has been provided with data Θ in assumed directions of arrival $\theta_1$ to $\theta_M$ from an external device (not illustrated) and can control the operation of the weighting factor calculating unit 51, the correlation matrix calculating unit 52, and the inverse matrix calculating unit 54 by using the data Θ. Note that the assumed directions of arrival $\theta_1$ to $\theta_M$ can be calculated on the basis of the position information of the transmitting stations $10_1$, ..., $10_K$ and the antenna array 20 obtained using the global navigation satellite system (GNSS). Alternatively, the assumed directions of arrival $\theta_1$ to $\theta_M$ may be calculated by a direction-of-arrival estimation system (not illustrated) on the basis of a direction-of-arrival estimating algorithm such as the multiple signal classification (MUSIC) method or the Capon method.

The correlation matrix calculating unit 52 calculates correlation matrices $R_{xx}(1)$ to $R_{xx}(K)$ of the reception signals $x_1(n, k)$ to $x_M(n, k)$ for the time slots Ts(1) to Ts(K), respectively, and stores the calculated correlation matrices $R_{xx}(1)$ to $R_{xx}(K)$ in the correlation matrix storing unit 53. The correlation matrix $R_{xx}(k)$ for the time slot Ts(k) can be expressed by the following equation (5).

$$R_{xx}(k) = E\{x(n, k)x^H(n, k)\} \qquad (5)$$

Here, E { } is a statistical average.

Specifically, the correlation matrix $R_{xx}(k)$ can be calculated by the following equation (6).

$$R_{xx}(k) = \frac{1}{N}x(n, k)x^H(n, k) \qquad (6)$$

Here, N denotes the number of snapshots.

In equation (6), reception signal vectors x(1, k) to x(N, k) of the N frames F(1) to F(N) are used for calculating the correlation matrix $R_{xx}(k)$, however, it is not limited thereto. Typically, the correlation matrix $R_{xx}(k)$ can be calculated on the basis of reception signal vectors x(n, k) to x(n+N−1, k) of the N frames F(n) to F(n+N−1). Here, n denotes any frame number.

Figure 3:
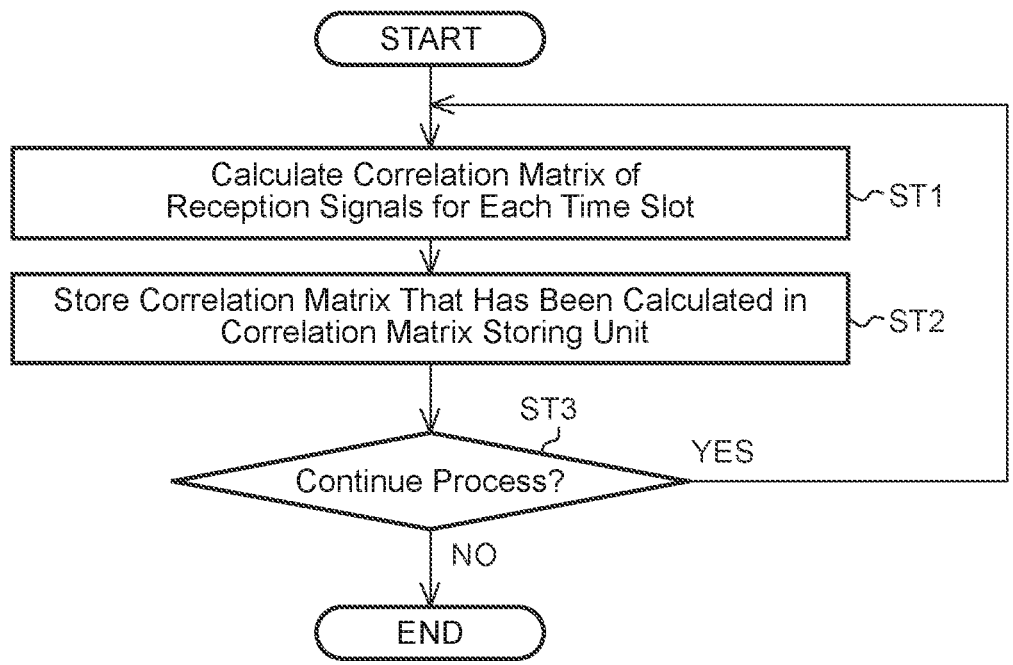
FIG. 3 is a flowchart schematically illustrating an exemplary procedure of a correlation matrix calculating process according to the first embodiment.

FIG. 3 is a flowchart schematically illustrating an example of a procedure of correlation matrix calculating processing. Referring to FIG. 3, the correlation matrix calculating unit 52 calculates the correlation matrix $R_{xx}(k)$ from N reception signal vectors x(n, k) to x(n+N−1, k) for each time slot Ts(k) (step ST1) and stores the correlation matrix $R_{xx}(k)$, which has been calculated, in the correlation matrix storing unit 53 (step ST2). Then, if the process is continued (YES in step ST3), the correlation matrix calculating unit 52 can update the correlation matrix $R_{xx}(k)$ by repeatedly executing steps ST1 and ST2. If an instruction not to continue the process has been received from the control unit 55 (NO in step ST3), the correlation matrix calculating unit 52 ends the correlation matrix calculating process.

When the antenna array 20 receives a desired wave through any one of the time slots Ts(1) to Ts(K) (hereinafter referred to as the "current time slot Ts(k)") at the current time, the inverse matrix calculating unit 54 illustrated in FIG. 1 acquires the correlation matrix calculated at previous time for another time slot Ts(i) (i≠k) from the correlation matrix storing unit 53. The inverse matrix calculating unit 54 regards the correlation matrix $R_{xx}(i)$, which has been acquired, as an interference noise correlation matrix and calculates an inverse matrix of the correlation matrix $R_{xx}(i)$ as an inverse matrix $R^{-1}(k)$ of the interference noise correlation matrix. Then, the inverse matrix calculating unit 54 provides the inverse matrix $R^{-1}(k)$ to the weighting factor calculating unit 51.

Here, as will be described later, from the viewpoint of improving the beamforming performance, it is desirable that the magnitude $\Delta\theta(=|\theta_k-\theta_i|)$ of a difference between directions of arrival of an assumed direction of arrival $\theta_i$ of a desired wave received through the other time slot Ts(i) and an assumed direction of arrival $\theta_k$ of the desired wave received through the current time slot Ts(k) be as great as possible.

The weighting factor calculating unit 51 can calculate the weighting factors $w_1^*(k)$ to $w_M^*(k)$ at the current time by executing a beamforming algorithm that maximizes the signal-to-interference-plus-noise power ratio (SINR) using the inverse matrix $R^{-1}(k)$ provided from the inverse matrix calculating unit 54 and the steering vector $a(\theta_k)$ of the assumed direction of arrival $\theta_k$ of the desired wave received through the current time slot Ts(k). The assumed direction of arrival $\theta_k$ can be acquired from the control unit 55.

Then, the weighting factor calculating unit 51 provides the beamforming unit 24 with the weighting factors $w_1^*(k)$ to $w_M^*(k)$ which have been calculated. As a result, the multipliers $25_1$ to $25_M$ of the beamforming unit 24 can perform weighting on the reception signals $x_1(n, k)$, $x_2(n, k)$, ..., and $x_M(n, k)$ with the weighting factors $w_1^*(k)$, $w_2^*(k)$, ..., $w_M^*(k)$, respectively, to generate weighted signals for the M channels. Note that, in the present embodiment, the weighting factor calculating unit 51 provides the beamforming unit 24 with the weighting factors $w_1^*(k)$ to $w_M^*(k)$. Alternatively, the weighting factor calculating unit 51 may provide the beamforming unit 24 with complex conjugates $w_1(k)$ to $w_M(k)$ as weighting factors. In this case, the multipliers $25_1$ to $25_M$ are only required to calculate the weighting factors $w_1^*(k)$ to $w_M^*(k)$ from the complex conjugates $w_1(k)$ to $w_M(k)$ and multiply (weight) the reception signals $x_1(n, k)$ to $x_M(n, k)$ by the weighting factors $w_1^*(k)$ to $w_M^*(k)$, respectively.

Next, processing procedures performed by the inverse matrix calculating unit 54 and the weighting factor calculating unit 51 will be described with reference to the flowchart of FIG. 4.

Figure 4:
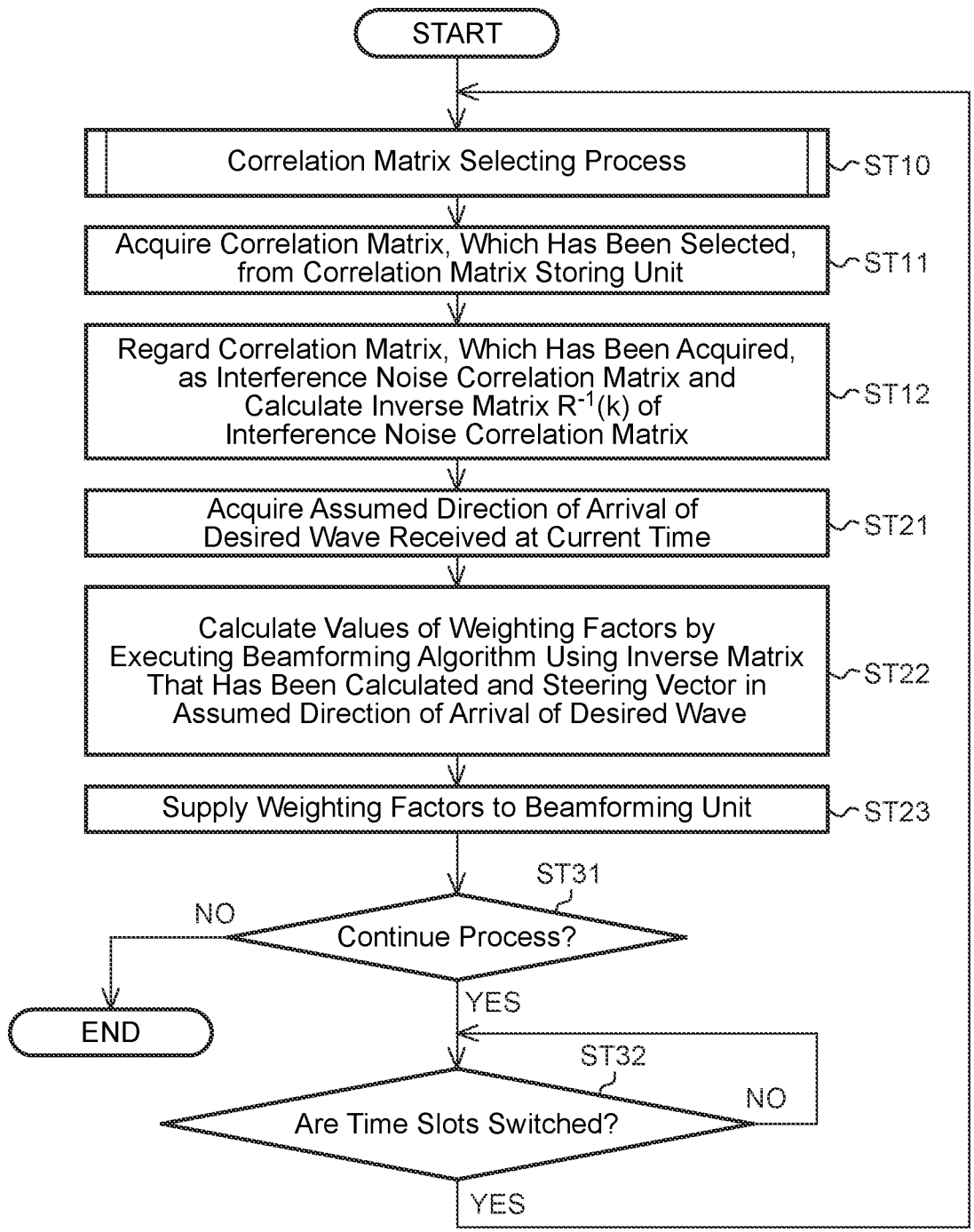
FIG. 4 is a flowchart schematically illustrating an example of a process procedure performed by an inverse matrix calculating unit and a weighting factor calculating unit of the first embodiment.

Referring to FIG. 4, the inverse matrix calculating unit 54 selects the correlation matrix $R_{xx}(i)$ calculated at previous time for another time slot other than the current time slot by executing the correlation matrix selecting process (step ST10). A specific example of the correlation matrix selecting process will be described later. Next, the inverse matrix calculating unit 54 acquires the correlation matrix $R_{xx}(i)$, which has been selected, from the correlation matrix storing unit 53 (step ST11). Then, the inverse matrix calculating unit 54 regards the correlation matrix $R_{xx}(i)$, which has been acquired, as an interference noise correlation matrix and calculates an inverse matrix of the correlation matrix $R_{xx}(i)$ as an inverse matrix $R^{-1}(k)$ of the interference noise correlation matrix (step ST12).

Next, the weighting factor calculating unit 51 acquires the assumed direction of arrival $\theta_k$ of the desired wave received at the current time from the control unit 55 (step ST21). Next, the weighting factor calculating unit 51 calculates the values of the weighting factors $w_1^*(k)$ to $w_M^*(k)$ by executing a beamforming algorithm using the inverse matrix $R^{-1}(k)$ calculated in step ST12 and the steering vector $a(\theta_k)$ of the assumed direction of arrival $\theta_k$ of the desired wave (step ST22). Then, the weighting factor calculating unit 51 provides the beamforming unit 24 with the weighting factors $w_1^*(k)$ to $w_M^*(k)$ (step ST23).

As a beamforming algorithm, the minimum variance and distortionless response (MVDR) beamforming algorithm can be used. Hereinafter, the MVDR beamforming will be described in detail.

The reception signal vector x(n, k) expressed by the equation (2) can be expressed by the sum of a desired wave component s(n, k) and an interference noise component $x_{i+n}(n, k)$ as expressed by the following equation (7).

$$x(n, k) = s(n, k) + x_{i+n}(n, k) \quad (7)$$

In equation (7), the desired wave component s(n, k) and the interference noise component $x_{i+n}(n, k)$ are defined as expressed in the following equations (8a) and (8b). Here, the desired wave component s(n, k), the interference wave component u(n, k) $a(\theta_u)$, and a thermal noise component N(n, k) are signal components statistically independent from each other.

$$s(n, k) = s_d(n, k)a(\theta_k) \quad (8a)$$

$$x_{i+n}(n, k) = u(n, k)a(\theta_u) + N(n, k) \quad (8b)$$

The signal-to-interference-plus-noise power ratio SINR(k) for the time slot Ts(k) is expressed by the following equation (9).

$$SINR(k) = \frac{w^H(k)R_s(k)w(k)}{w^H(k)R_{i+n}(k)w(k)} \quad (9)$$

In equation (9), $R_s(k)$ denotes a correlation matrix of the desired wave component s(n, k), and $R_{i+n}(k)$ denotes a correlation matrix (interference noise correlation matrix) of the interference noise component $x_{i+n}(n, k)$. The correlation matrices $R_s(k)$ and $R_{i+n}(k)$ can be expressed as the following equations (10) and (11).

$$R_s(k) = E\{s(n, k)s^H(n, k)\} \quad (10)$$

$$R_{i+n}(k) = E\{x_{i+n}(n, k)x_{i+n}^H(n, k)\} \quad (11)$$

Taking equations (8a) and (10) into consideration, the signal-to-interference-plus-noise power ratio SINR(k) of the following equation (12) is derived from equation (9).

$$SINR(k) = \frac{\sigma_s^2(k)|w^H(k)a(\theta_k)|^2}{w^H(k)R_{i+n}(k)w(k)} \quad (12)$$

In equation (12), $\sigma_s^2(k)$ is expressed by the following equation (13).

$$\sigma_s^2(k) = E\{|s_d(n, k)|^2\} \quad (13)$$

In the MVDR beamforming, a weighting factor vector that maximizes the signal-to-interference-plus-noise power ratio SINR(k) expressed by the following equation (12) can be calculated under a constraint condition of the following equation (14).

$$w^H(k)a(\theta_k) = 1 \qquad (14)$$

That is, in the MVDR beamforming, an Hermitian conjugate amount $w_{opt}^H(k)$ corresponding to the optimum amount $w_{opt}(k)$ of the vector w(k) that minimizes the denominator of the right side of equation (12) as expressed by the following equation (15) can be calculated as the weighting factor vector under the constraint condition of equation (14).

$$w_{opt}(k) = \underset{w(k)}{\operatorname{argmin}} w^H(k) R_{i+n}(k) w(k) \qquad (15)$$

The solution of equation (15) is given by the following equation (16).

$$w_{opt}^H(k) = \frac{a^H(\theta_k) R_{i+n}^{-1}(k)}{a^H(\theta_k) R_{i+n}^{-1}(k) a(\theta_k)} \qquad (16)$$

Here, a superscript "H" indicates a Hermitian conjugate (transposition and complex conjugate).

In step ST22 of FIG. 4, the weighting factor calculating unit 51 can calculate the Hermitian conjugate amount $w_{opt}^H(k)$ corresponding to the optimum amount $w_{opt}(k)$ on the basis of equation (16). That is, the weighting factor calculating unit Si can calculate the Hermitian conjugate amount $w_{opt}^H(k)$ as expressed by the following equation (17) by substituting the inverse matrix $R^{-1}(k)$ of the interference noise correlation matrix calculated in step ST12 into an inverse matrix $R_{i+n}^{-1}(k)$ of equation (16).

$$w_{opt}^H(k) = \frac{a^H(\theta_k) R^{-1}(k)}{a^H(\theta_k) R^{-1}(k) a(\theta_k)} \qquad (17)$$

The weighting factor calculating unit 51 can supply vector elements of the Hermitian conjugate amount $w_{opt}^H(k)$ to the beamforming unit 24 as a weighting factor (step ST23). If the process is to be continued after step ST23 (YES in step ST31), the control unit 55 causes the inverse matrix calculating unit 54 and the weighting factor calculating unit 51 to stand by until time slots are switched (NO in step ST32). If time slots tare switched (YES in step ST32), the inverse matrix calculating unit 54 and the weighting factor calculating unit 51 execute steps ST10 to ST12 and ST21 to ST23. In a case where the control unit 55 determines not to continue the process (NO in step ST31), the process ends.

As described above, the MVDR beamforming is a method of obtaining a weighting factor that maximizes the signal-to-interference-plus-noise power ratio under a predetermined constraint condition using the interference noise correlation matrix and the steering vector in the direction of arrival of a desired wave. Meanwhile, the MPDR is a method of obtaining a weighting factor that maximizes the SINR under a predetermined constraint condition using a correlation matrix of a reception signal including a desired wave component and an interference wave component and a steering vector in the direction of arrival of a desired wave. The robustness against an error in the steering vector is higher for the MVDR beamforming than for the MPDR beamforming. However, the MVDR beamforming of the related art has a disadvantage that a communication throughput decreases since it is necessary to provide a time period in which the desired wave is not received in order to calculate the interference noise correlation matrix. This disadvantage will be described with reference to FIGS. 5 to 7.

Figure 5:
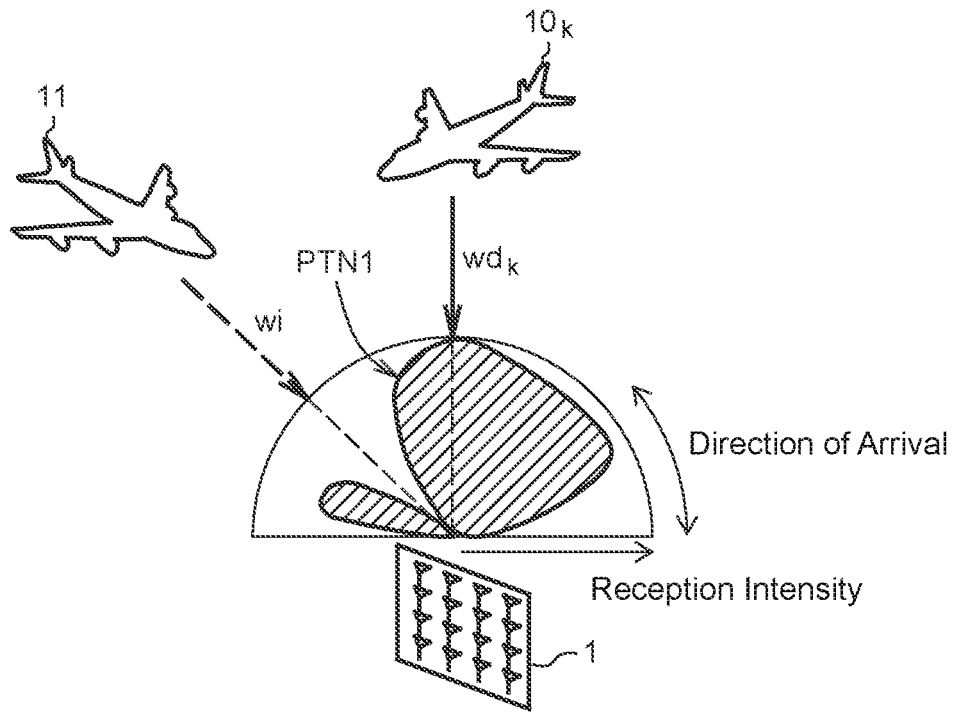
FIG. 5 is a schematic diagram for explaining an interference wave suppressing process by MPDR beamforming.
Figure 6:
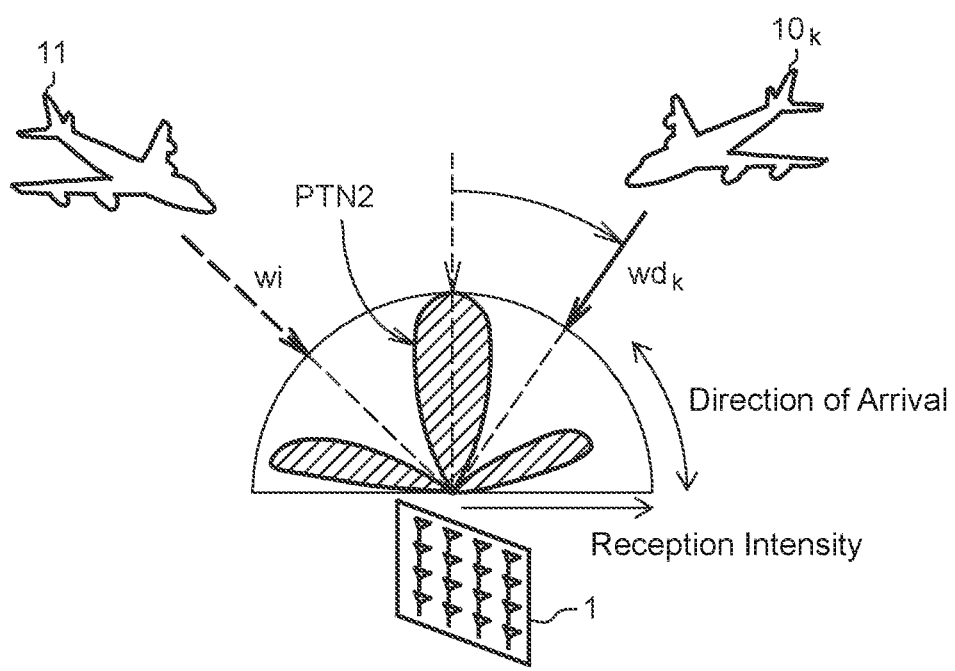
FIG. 6 is a schematic diagram for explaining a problem caused by MPDR beamforming.
Figure 7:
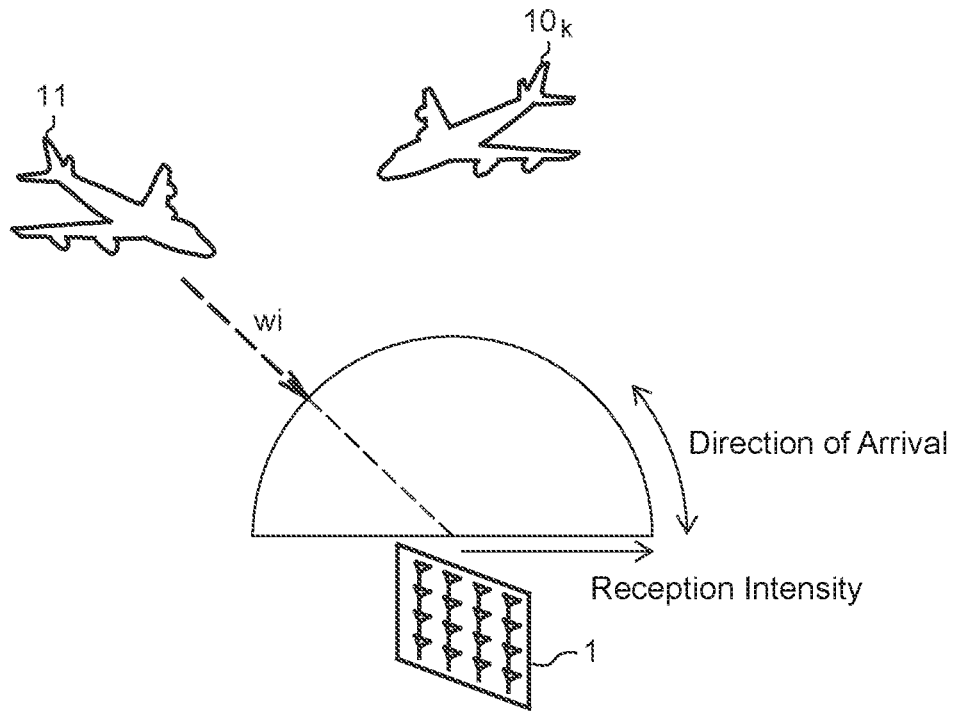
FIG. 7 is a schematic diagram for explaining a problem caused by MVDR beamforming of the related art.

FIG. 5 is a schematic diagram for explaining an interference wave suppressing process by the MPDR beamforming, FIG. 6 is a schematic diagram for explaining a disadvantage caused by the MPDR beamforming, and FIG. 7 is a schematic diagram for explaining a disadvantage caused by the MVDR beamforming of the related art. In FIGS. 5 to 7, directivity response patterns (distribution of reception intensity regarding the direction of arrival) of the transmitting station $10_k$, the interfering station 11, and the adaptive array antenna system 1 are illustrated.

As illustrated in FIG. 5, a directivity response pattern PTN1 formed by the MPDR beamforming can effectively suppress a signal component (interference wave component) of an interference wave wi arriving from the interfering station 11 unless an error occurs in the steering vector. However, when an error occurs in the steering vector, as illustrated in FIG. 6, a directivity response pattern PTN2 formed by the MPDR beamforming suppresses a signal component of the desired wave $wd_k$ (desired wave component), and thus there is a disadvantage that the communication quality is deteriorated. Meanwhile, in a case where a directivity response pattern is to be formed by the MVDR beamforming of the related art, it is necessary to receive the interference wave wi arriving from the interfering station 11 in a time period in which the desired wave is not received from the transmitting station $10_k$ as illustrated in FIG. 7, and thus there is a disadvantage that a communication throughput decreases.

Figure 8:
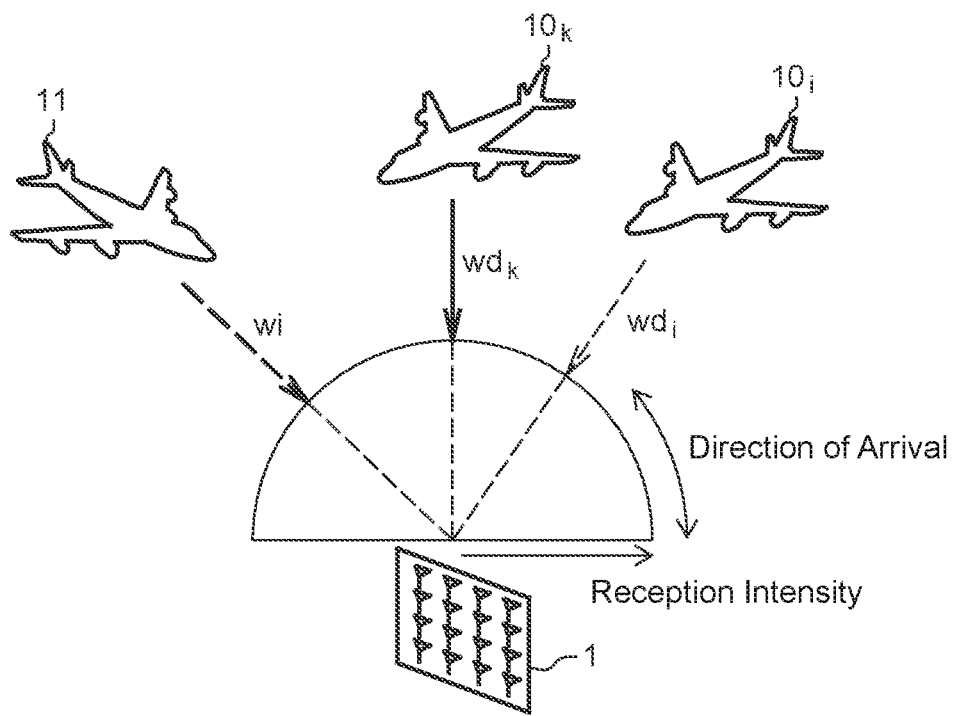
FIG. 8 is a schematic diagram for explaining an interference wave suppressing process according to the first embodiment.
Figure 9:
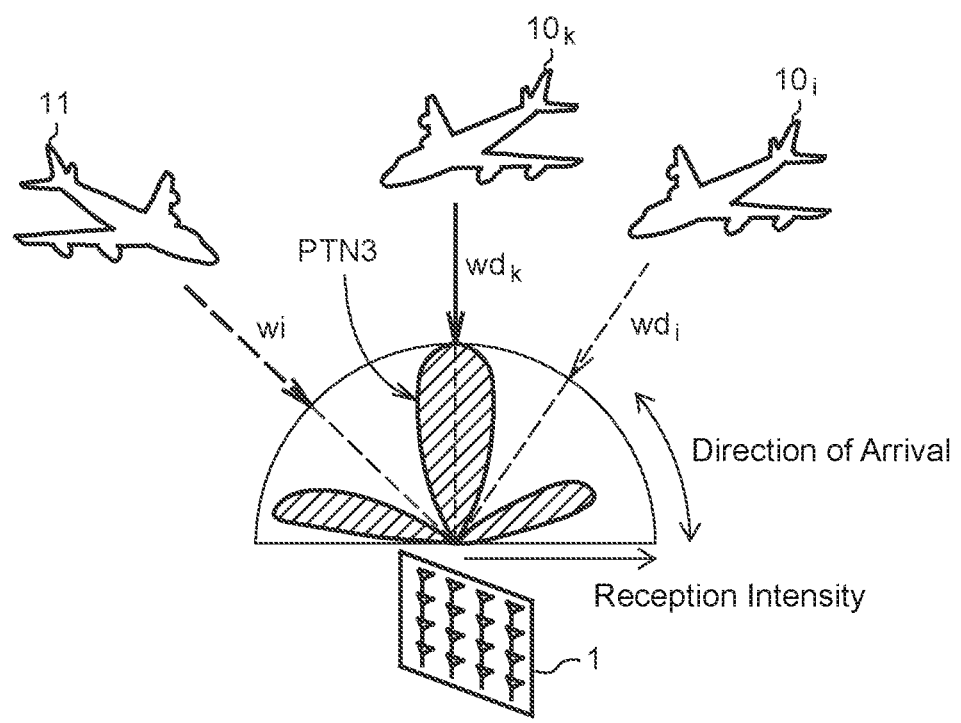
FIG. 9 is a schematic diagram for explaining an interference wave suppressing process according to the first embodiment.

On the other hand, the adaptive array antenna system 1 of the present embodiment regards a desired wave wd; having arrived at previous time from the transmitting station $10_i$ (i≠k) through another time slot Ts(i) as an interference wave even in the time period in which the desired wave $wd_k$ is received from the transmitting station $10_k$ through the current time slot Ts(k) as illustrated in FIG. 8 and uses an inverse matrix of the correlation matrix $R_{xx}(i)$ calculated for the other time slot Ts(i) as the inverse matrix $R^{-1}(k)$ of the interference noise correlation matrix. Therefore, as illustrated in FIG. 9, the directivity response pattern PTN3 formed according to the present embodiment can effectively suppress an undesirable signal component arriving from a direction other than the direction of arrival of the desired wave $wd_k$ at the current time without decreasing the communication throughput.

Next, a specific example of the correlation matrix selecting process (step ST10) in FIG. 4 will be described with reference to FIGS. 10 and 11.

Figure 10:
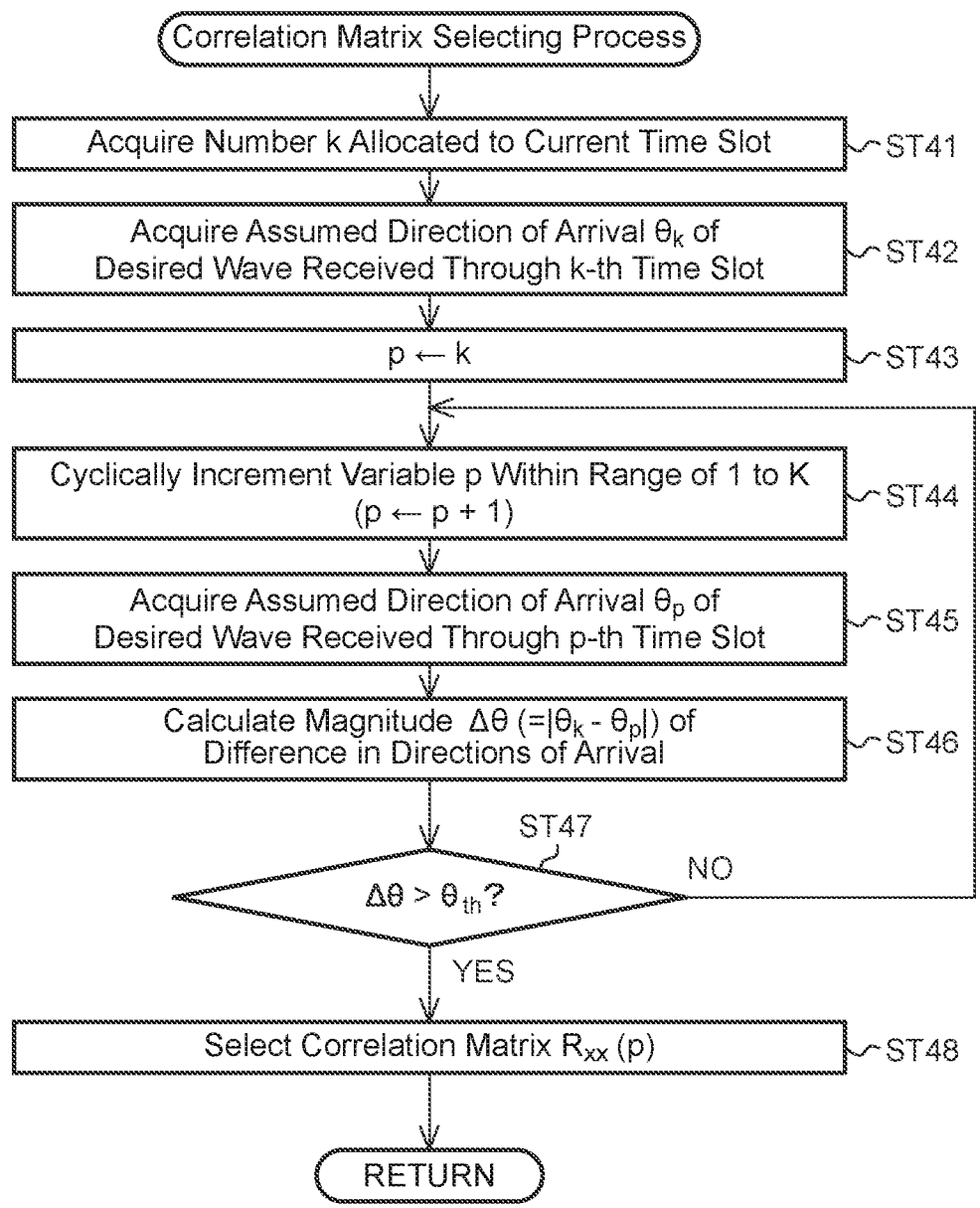
FIG. 10 is a flowchart illustrating a procedure of a first specific example of a correlation matrix selecting process according to the first embodiment.

FIG. 10 is a flowchart schematically illustrating a procedure of a first specific example of the correlation matrix selecting process. In the first specific example, the inverse matrix calculating unit 54 selects a correlation matrix $R_{xx}(p)$ as the interference noise correlation matrix so as to satisfy the condition that the magnitude $\Delta\theta(=|\theta_k-\theta_p|)$ of a difference in the directions of arrival between the assumed direction of arrival $\theta_k$ of the desired wave received through the current time slot Ts(k) and the assumed direction of arrival $\theta_p$ of the desired wave received at previous time through a time slot Ts(p) (p≠k) other than the current time slot Ts(k) exceeds a threshold value $\theta_{th}$.

Referring to FIG. 10, the inverse matrix calculating unit 54 acquires the number k allocated to the current time slot Ts(k) from the control unit 55 (step ST41) and then acquires the assumed direction of arrival $\theta_k$ of the desired wave received through the k-th time slat, that is, the current time slot Ts(k) from the control unit 55 (step ST42). Next, the inverse matrix calculating unit 54 initializes the value of a variable p indicating the time slot number to "k" (step ST43).

Then, the inverse matrix calculating unit 54 cyclically increments the variable p within a range of 1 to K (step ST44).

Next, the inverse matrix calculating unit 54 acquires an assumed direction of arrival $\theta_p$ of the desired wave that has been received through a p-th time slot Ts(p) from the control unit 55 (step ST45). Next, the inverse matrix calculating unit 54 calculates the magnitude $\Delta\theta(=|\theta_k-\theta_p|)$ of a difference in the directions of arrival (step ST46) and determines whether or not the magnitude $\Delta\theta$ exceeds a preset threshold value $\theta_{th}$ (step ST47). If the magnitude $\Delta\theta$ does not exceed the threshold value $\theta_{th}$ (NO in step ST47), the inverse matrix calculating unit 54 executes steps ST44 to ST46 again.

If the magnitude $\Delta\theta$ exceeds the threshold value $\theta_{th}$ (YES in step ST47), the inverse matrix calculating unit 54 selects the correlation matrix $R_{xx}(p)$ calculated for the p-th time slot Ts(p) as the interference noise correlation matrix (step ST48).

Next, a second specific example of the correlation matrix selecting process will be described. FIG. 11 is a flowchart illustrating a schematic procedure of the second specific example of the correlation matrix selecting process. In the second specific example, the inverse matrix calculating unit 54 selects a correlation matrix $R_{xx}(p=p_{max})$ as the interference noise correlation matrix so as to satisfy the condition that the magnitude $\Delta\theta(=|\theta_k-\theta_p|)$ of a difference in the directions of arrival between the assumed direction of arrival $\theta_k$ of the desired wave received through the current time slot Ts(k) and the assumed direction of arrival $\theta_p$ of the desired wave received at previous time through a time slot Ts(p) (p≠k) other than the current time slot Ts(k) is maximized.

Figure 11:
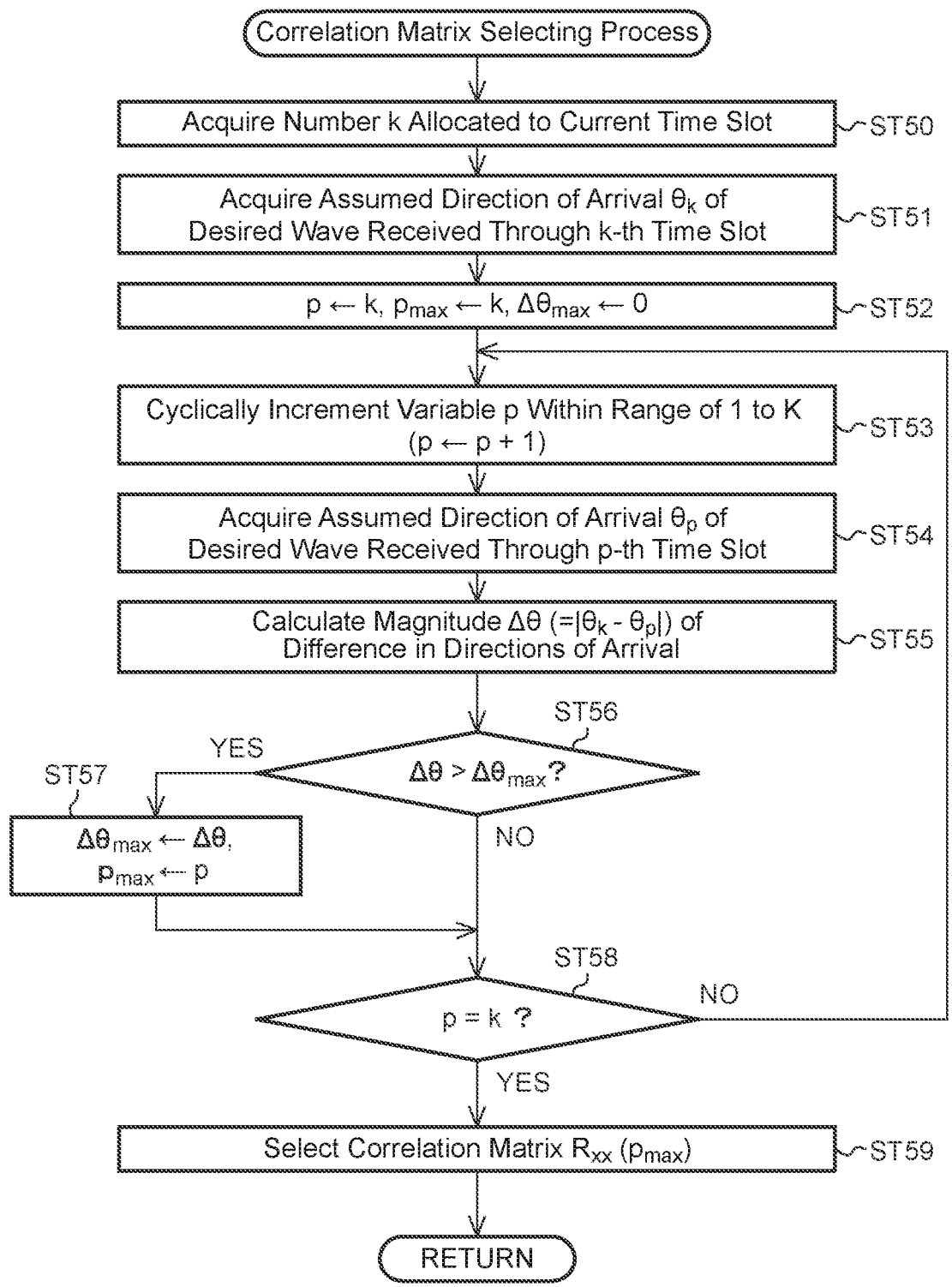
FIG. 11 is a flowchart illustrating a procedure of a second specific example of the correlation matrix selecting process according to the first embodiment.

Referring to FIG. 11, the inverse matrix calculating unit 54 acquires the number k allocated to the current time slot Ts(k) from the control unit 55 (step ST50) and then acquires the assumed direction of arrival $\theta_k$ of the desired wave received through the k-th time slot, that is, the current time slot Ts(k) from the control unit 55 (step ST51). Next, the inverse matrix calculating unit 54 initializes the values of variables p and $p_{max}$ indicating time slot numbers to "k" and initializes the value of a variable $\Delta\theta_{max}$ indicating the magnitude of a difference in the directions of arrival to "0" (step ST52).

Then, the inverse matrix calculating unit 54 cyclically increments the variable p within a range of 1 to K as in step ST44 of FIG. 10 (step ST53). Next, the inverse matrix calculating unit 54 acquires an assumed direction of arrival $\theta_p$ of the desired wave received through a p-th time slot Ts(p) from the control unit 55 (step ST54) and calculates the magnitude $\Delta\theta(=|\theta_k-\theta_p|)$ of a difference in the directions of arrival (step ST55).

If the magnitude $\Delta\theta$ does not exceed a variable $\theta_{max}$ (NO in step ST56), the inverse matrix calculating unit 54 shifts the process to step ST58. On the other hand, if the magnitude $\Delta\theta$ exceeds the variable $\theta_{max}$ (YES in step ST56), the inverse matrix calculating unit 54 sets the variable $\Delta\theta_{max}$ to the magnitude $\Delta\theta$ and sets a variable $p_{max}$ to the variable p (step ST57). Then, the process proceeds to step ST58.

In step ST58, the inverse matrix calculating unit 54 determines whether or not the variable p has reached the current time slot number k. If the variable p has not reached the current time slot number k (NO in step ST58), the inverse matrix calculating unit 54 executes step ST53 again.

If the variable p has reached the current time slot number k (YES in step ST58), the inverse matrix calculating unit 54 selects the correlation matrix $R_{xx}(p_{max})$ as the interference noise correlation matrix (step ST59).

As described above, in the adaptive array antenna system 1 of the first embodiment, the correlation matrix having been calculated at previous time for another time slot other than the current time slot is regarded as the interference noise correlation matrix, and the weighting factors $w_1^*(k)$ to $w_M^*(k)$ are calculated using the inverse matrix $R^{-1}(k)$ of the interference noise correlation matrix. Therefore, even when an error occurs in the steering vector in an assumed direction of arrival of a desired wave at the current time, the adaptive array antenna system 1 can perform beamforming while suppressing deterioration of the communication quality without reducing the communication throughput.

Note that all or some of the functions of the adaptive signal processing device 41 can be implemented by a single or a plurality of processors including a semiconductor integrated circuit such as a digital signal processor (DSP), an application specific integrated circuit (ASIC), or a programmable logic device (PLD). Here, the PLD is a semiconductor integrated circuit whose function can be freely modified by a designer after manufacture of the PLD. Examples of the PLD include a field-programmable gate array (FPGA). Alternatively, all or some of the functions of the adaptive signal processing device 41 may be implemented by a single or a plurality of processors including an arithmetic device such as a central processing unit (CPU) or a graphics processing unit (GPU) for executing program codes of software or firmware. Further alternatively, all or some of the functions of the adaptive signal processing device 41 can be implemented by a single or a plurality of processors including a combination of a semiconductor integrated circuit such as a DSP, an ASIC, or a PLD and an arithmetic device such as a CPU or a GPU.

Figure 12:
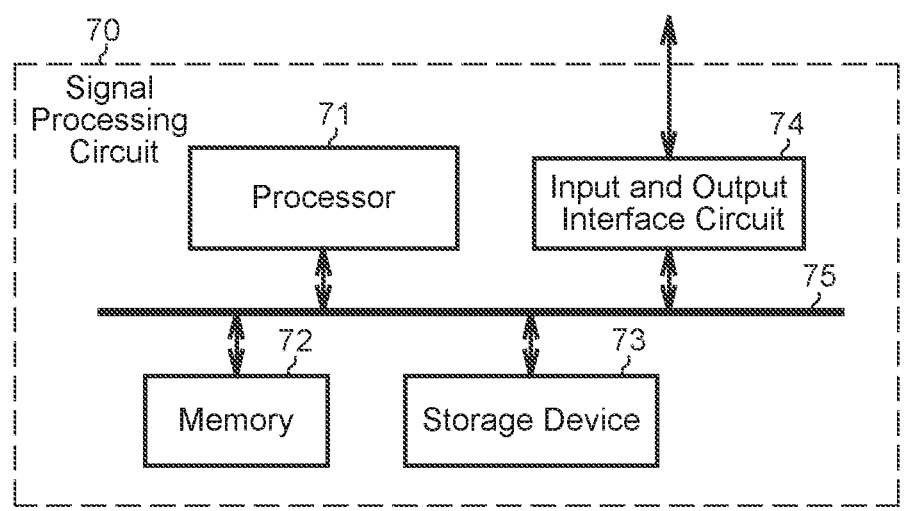
FIG. 12 is a block diagram illustrating a hardware configuration example of an adaptive signal processing device according to the first embodiment.

FIG. 12 is a block diagram illustrating a schematic configuration of a signal processing circuit 70, which is an example of the hardware configuration of the adaptive signal processing device 41 according to the first embodiment. The signal processing circuit 70 illustrated in FIG. 12 includes a processor 71, an input and output interface circuit 74, a memory 72, a storage device 73, and a signal path 75. The signal path 75 is a bus for connecting the processor 71, the input and output interface circuit 74, the memory 72, and the storage device 73 to each other. The input and output interface circuit 74 has a function of transferring a digital signal input from the outside to the processor 71 and also has a function of outputting the digital signal transferred from the processor 71 to the outside.

The memory 72 includes a work memory used when the processor 71 executes digital signal processing and a temporary storage memory in which data used in the digital signal processing is loaded. For example, the memory 72 is only required to include a semiconductor memory such as a flash memory and a synchronous dynamic random access memory (SDRAM). Meanwhile, in a case where the processor 71 includes an arithmetic device such as a CPU or a GPU, the storage device 73 can be used as a storage medium for storing codes of a signal processing program of software or firmware to be executed by the arithmetic device. For example, the storage device 73 is only required to include a non-volatile semiconductor memory such as a flash memory or a read only memory (ROM).

Note that although the number of processors 71 is one in the example of FIG. 12, it is not limited thereto. The hardware configuration of the adaptive signal processing device 41 may be implemented by using a plurality of processors that operate in cooperation with each other.

Second Embodiment

Figure 13:
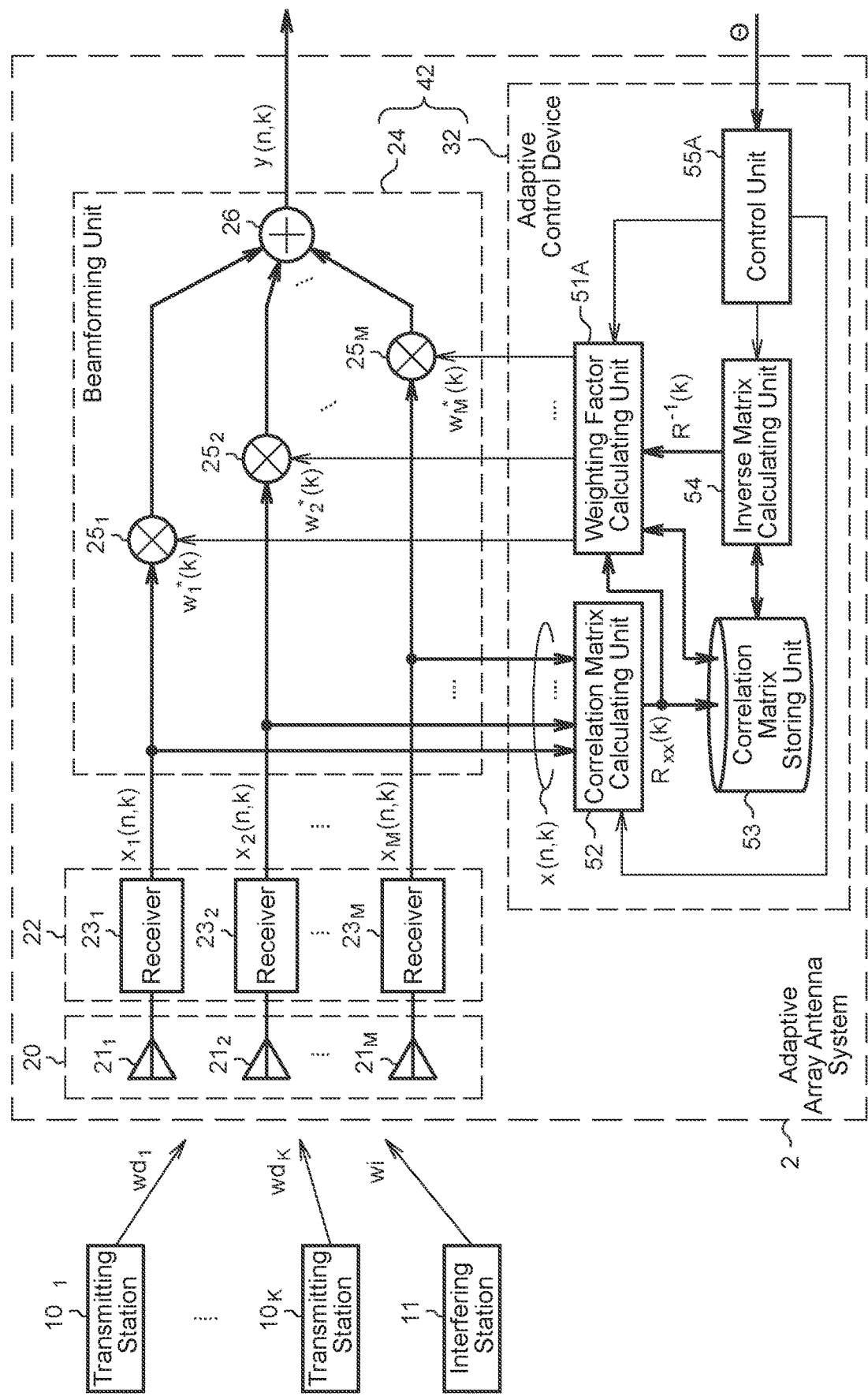
FIG. 13 is a diagram illustrating a schematic configuration of an adaptive array antenna system according to a second embodiment of the present invention.

Next, a second embodiment of the present invention will be described. FIG. 13 is a diagram illustrating a schematic configuration of an adaptive array antenna system 2 according to the second embodiment of the present invention.

The configuration of the adaptive array antenna system 2 of the present embodiment is the same as the configuration of the adaptive array antenna system 1 of the first embodiment except that an adaptive control device 32 of FIG. 13 is included instead of the adaptive control device 31 of the first embodiment. In addition, the configuration of the adaptive control device 32 of the present embodiment is the same as the configuration of the adaptive control device 31 of the first embodiment except that a weighting factor calculating unit 51A and a control unit 55A of FIG. 13 are included instead of the weighting factor calculating unit 51 and the control unit 55 of the first embodiment. The control unit 55A has been provided with data Θ in assumed directions of arrival $\theta_1$ to $\theta_M$ from an external device (not illustrated) and can control the operation of the weighting factor calculating unit 51A, the correlation matrix calculating unit 52, and the inverse matrix calculating unit 54 by using the data Θ. An adaptive signal processing device 42 of the present embodiment includes a beamforming unit 24 and the adaptive control device 32.

The weighting factor calculating unit 51A can calculate the weighting factors $w_1^*(k)$ to $w_M^*(k)$ at the current time by executing a beamforming algorithm different from that of the weighting factor calculating unit 51 of the first embodiment.

Figure 14:
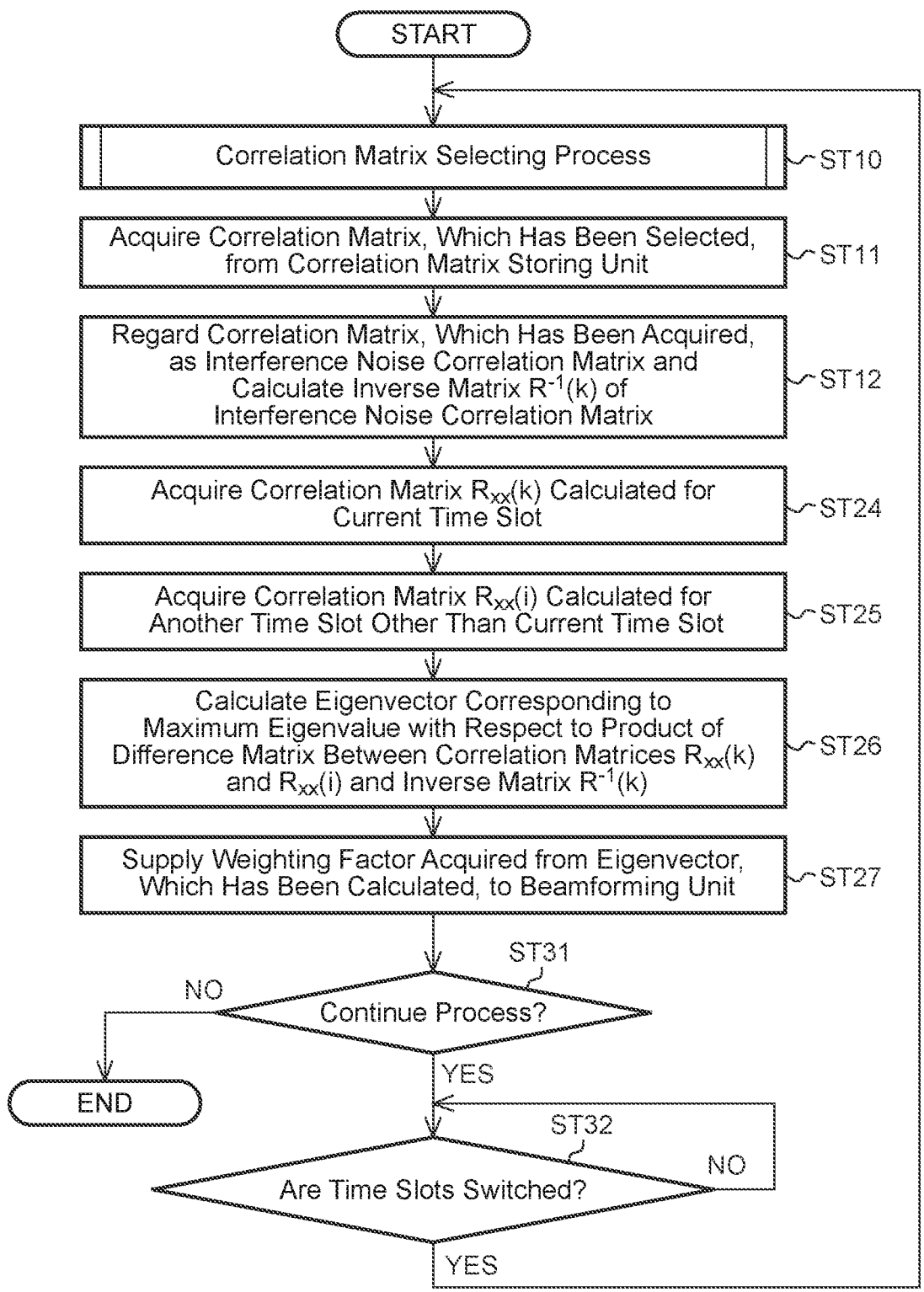
FIG. 14 is a flowchart schematically illustrating an example of a process procedure performed by an inverse matrix calculating unit and a weighting factor calculating unit of the second embodiment.

The operation of the weighting factor calculating unit 51A will be described with reference to FIG. 14. FIG. 14 is a flowchart schematically illustrating an example of a process procedure performed by the inverse matrix calculating unit 54 and the weighting factor calculating unit 51A of the second embodiment. The flowchart of FIG. 14 is the same as the flowchart of FIG. 4 except that steps ST24 to ST27 of FIG. 14 are included instead of steps ST21 to ST23 of FIG. 4.

Referring to FIG. 14, in step ST24, the weighting factor calculating unit 51A acquires the correlation matrix $R_{xx}(k)$ calculated for the current time slot Ts(k) from the correlation matrix calculating unit 52. In the next step ST25, the weighting factor calculating unit 51A acquires correlation matrix $R_{xx}(i)$ calculated at previous time for another time slot Ts(i) (i≠k) other than the current time slot Ts(k) from the correlation matrix storing unit 53. For example, as the other time slot Ts(i), a time slot Ts(k−1) adjacent to the current time slot Ts(k) can be selected.

In step ST26, the weighting factor calculating unit 51A calculates an eigenvector of M dimensions (M rows and one column) corresponding to the maximum eigenvalue with respect to a product of a difference matrix ΔS between the correlation matrices $R_{xx}(k)$ and $R_{xx}(i)$ and the inverse matrix $R^{-1}(k)$ calculated in step ST12 ($=R^{-1}(k)\cdot\Delta S$). As will be described in detail later, this eigenvector is the optimum amount $w_{opt}(k)$ of the vector w(k).

After step ST26, the weighting factor calculating unit 51A calculates weighting factors $w_1^*(k)$ to $w_M^*(k)$ from the M vector elements of the calculated eigenvector and supplies the weighting factors $w_1^*(k)$ to $w_M^*(k)$ to the beamforming unit 24 (step ST27). As a result, the multipliers 25$_1$ to 25$_M$ of the beamforming unit 24 can multiply (weight) the reception signals $x_1(n, k), x_2(n, k), \ldots, x_M(n, k)$ with the weighting factors $w_1^*(k), w_2^*(k), \ldots, w_M^*(k)$, respectively, to generate weighted signals for the M channels. The combiner 26 combines the weighted signals to generate a combined signal y(n, k).

Next, the reason why the eigenvector calculated in step ST26 is the optimum amount $w_{opt}(k)$ of the vector w(k) will be described below.

In the present of embodiment, the optimum amount $w_{opt}(k)$ of the vector w(k) that maximizes the signal-to-interference-plus-noise power ratio SINR(k) of the equation (9) is obtained under the constraint condition of the following equation (18).

$$w^H(k)R_s(k)w(k) = 1 \quad (18)$$

Specifically, the optimum amount $w_{opt}(k)$ of the vector w(k) that minimizes the denominator of the right side of equation (9) is obtained as expressed in the following equation (19) under the constraint condition of equation (18).

$$w_{opt}(k) = \operatorname*{argmin}_{w(k)} w^H(k)R_{i+n}(k)w(k) \quad (19)$$

According to Non-Patent Literature 2 below, it is explained that there can be the optimum amount $w_{opt}(k)$ of the vector w(k) in a case where there is the maximum value of a reciprocal 1/λ of a coefficient λ as expressed by the following equation (20).

$$R_{i+n}(k)w(k) = \lambda R_s(k)w(k) \quad (20)$$

Non-Patent Literature 2: S. Shahbazpanahi, A. B, Gershman, Z.-Q. Luo and K. M. Wong, "Robust Adaptive Beamforming for General-Rank Signal Models," IEEE Transactions on Signal Processing, vol. 51, no. 9, pp. 2257-2269, 2003.

Equation (20) can be transformed into the following equation (21).

$$R_{i+n}^{-1}(k)R_s(k)w(k) = \frac{1}{\lambda}w(k) \quad (21)$$

According to equation (21), it is possible to regard a reciprocal 1/λ as the eigenvalue of a matrix $R_{i+n}^{-1}(k)R_s(k)$ and the vector w(k) as the eigenvector corresponding to the eigenvalue. If there is a maximum eigenvalue of the matrix $R_{i+n}^{-1}(k)R_s(k)$, the eigenvector corresponding to the maximum eigenvalue can be derived as the optimum amount $w_{opt}(k)$ of equation (19).

Now, assuming that an operator for calculating the eigenvector corresponding to the maximum eigenvalue of a matrix is denoted by $\Phi\{\ \}$, the optimum amount $w_{opt}(k)$ of the vector $w(k)$ can be calculated by the following equation (22).

$$w_{opt}(k) = \Phi\{R_{i+n}^{-1}(k)R_s(k)\} \quad (22)$$

As an algorithm for obtaining the maximum eigenvalue and the eigenvector, it is only required to use, for example, a QZ algorithm called Cholesky decomposition or Schur decomposition.

On the other hand, in a case where the number of snapshots N is sufficiently large and the desired wave and an interference wave are not correlated with each other, a correlation matrix $\Lambda(k)$ at the current time is expressed by the following equations (23).

$$\Lambda(k) = \lim_{N \to \infty} R_{xx}(k) = S(k) + R_{i+n} \quad (23)$$

In equations (23), $S(k)$ is a correlation matrix of the desired wave and includes information of the direction of arrival $\theta_k$ of the desired wave at the current time. The correlation matrix $S(k)$ is expressed by the following equation (24).

$$S(k) = \sigma_s^2(k) a(\theta_k) a^H(\theta_k) \quad (24)$$

Furthermore, in equations (23), $R_{i+n}$ is a correlation matrix derived from an interference component and a thermal noise component, and the correlation matrix $R_{i+n}$ is constant regardless of k. In this case, a difference matrix $\Delta S$ between correlation matrices $\Lambda(k)$ and $\Lambda(i)$ that are different from each other is as expressed by the following equations (25).

$$\Delta S = \Lambda(k) - \Lambda(i) = S(k) - S(i) \quad (25)$$

When a difference in directions of arrival between the transmitting stations $10_k$ and $10_i$ is sufficiently large and a difference in directions of arrival between the interfering station 11 and the transmitting station $10_i$ is sufficiently large, the following approximations (26a) and (26b) hold.

$$a^H(\theta_k)a(\theta_i) \approx 0 \quad (26a)$$

$$a^H(\theta_u)a(\theta_i) \approx 0 \quad (26b)$$

Here, $a^H(\theta_k)$ is a Hermitian conjugate amount corresponding to a steering vector $a(\theta_k)$ in the assumed direction of arrival $\theta_k$ of the desired wave $wd_k$, and $a^H(\theta_u)$ is a Hermitian conjugate amount corresponding to a steering vector $a(\theta_u)$ in the assumed direction of arrival $\theta_u$ of the interference wave.

According to Non-Patent Literature 3 below, the following equation (27) can be derived as an inverse matrix $R_{i+n}^{-1}$ of the correlation matrix $R_{i+n}$.

$$R_{i+n}^{-1} = \frac{1}{\sigma_n^2}\left(I_L - \frac{\sigma_u^2}{\sigma_u^2 + \sigma_n^2}\left(\frac{1}{\sqrt{L}}a(\theta_u)\right)\left(\frac{1}{\sqrt{L}}a(\theta_u)\right)^H\right) \quad (27)$$

Here, $I_L$ denotes an L-order unit matrix (L is a positive integer), $\sigma_n^2$ denotes thermal noise power, and $\sigma_u^2$ denotes interference wave power.

Non-Patent Literature 3; Stephen M. Kogon, "Eigenvectors, Diagonal Loading and White Noise Gain Constraints for Robust Adaptive Beamforming", The Thirty-Seventh Asilomar Conference on Signals, Systems and Computers, Pacific Grove, Vol. 2, pp. 1853-1857, 2003.

The following approximation (28) can be derived for the inverse matrix $R_{xx}^{-1}(i)$ of the correlation matrix $R_{xx}(i)$ if the derivation method of equation (27) is applied.

$$R_{xx}^{-1}(i) \cong \frac{1}{\sigma_n^2}\left(I_L - \frac{\sigma_u^2}{\sigma_u^2 + \sigma_n^2}\left(\frac{1}{\sqrt{L}}a(\theta_u)\right)\left(\frac{1}{\sqrt{L}}a(\theta_u)\right)^H - \frac{\sigma_s^2}{\sigma_s^2 + \sigma_n^2}\left(\frac{1}{\sqrt{L}}a(\theta_i)\right)\left(\frac{1}{\sqrt{L}}a(\theta_i)\right)^H\right) \quad (28)$$

If approximation (26a) is considered, the following approximation (29) is derived from equations (24) and (27) and approximation (28).

$$R_{xx}^{-1}(i)S(k) \cong R_{i+n}^{-1}S(k) \quad (29)$$

In addition, if approximation (26b) is considered, the following approximation (30) is derived from equation (24) and approximation (28).

$$R_{xx}^{-1}(i)S(i) \cong \frac{\sigma_s^2(i)}{\sigma_s^2(i) + \sigma_n^2}a(\theta_i)a^H(\theta_i) \quad (30)$$

Here, the relationship of $a^H(\theta_i)a(\theta_i)=L$ is used.

If approximations (29) and (30) are considered, the product of the inverse matrix $R_{xx}^{-1}(i)$ and a difference matrix $\Delta S(=S(k)-S(i))$ of equations (25) is expressed by the following approximation (31).

$$R_{xx}^{-1}(i)\Delta S = R_{xx}^{-1}(i)S(k) - R_{xx}^{-1}(i)S(i) \cong R_{i+n}^{-1}S(k) - \frac{\sigma_s^2(i)}{\sigma_s^2(i) + \sigma_n^2}a(\theta_i)a^H(\theta_i) \quad (31)$$

In a case where approximation (31) is eigenvalue expanded, an eigenvalue obtained from the first term on the right side of approximation (31) is a positive value, and an eigenvalue obtained from the second term on the right side of approximation (31) is a negative value. Therefore, the following approximation (32) approximately holds by the operator $\Phi\{\ \}$.

$$\Phi\{R_{xx}^{-1}(i)\Delta S\} \cong \Phi\{R_{i+n}^{-1}S(k)\} \quad (32)$$

A correlation matrix $S(k)$ matches a correlation matrix $R_s(k)$ in a case where there is no error in the assumed direction of arrival. Therefore, approximation (32) indicates occurrence of a state in which a term regarding the correlation matrix S(i) can be ignored in the process of calculating an eigenvector corresponding to the maximum eigenvalue of a matrix $R_{xx}^{-1}(i)\Delta S$.

Therefore, the weighting factor calculating unit 51A can calculate the optimum amount $w_{opt}(k)$ of the vector w(k) by substituting the inverse matrix $R^{-1}(k)$ of the interference noise correlation matrix calculated in step ST12 into the inverse matrix $R_{i+n}^{-1}(k)$ of equation (22) and substituting the difference matrix $\Delta S$ calculated by the following approximation (33) into the matrix $R_s(k)$ of equation (22).

$$\Delta S \cong R_{xx}(k) - R_{xx}(i) \qquad (33)$$

As described above, in the adaptive array antenna system 2 of the second embodiment, the correlation matrix having been calculated at previous time for another time slot other than the current time slot is regarded as the interference noise correlation matrix, and the weighting factors $w_1^*(k)$ to $w_M^*(k)$ are calculated using the inverse matrix $R^{-1}(k)$ of the interference noise correlation matrix. Therefore, even when an error occurs in the steering vector in an assumed direction of arrival of a desired wave at the current time, the adaptive array antenna system 2 can perform beamforming while suppressing deterioration of the communication quality without reducing the communication throughput.

Third Embodiment

Figure 15:
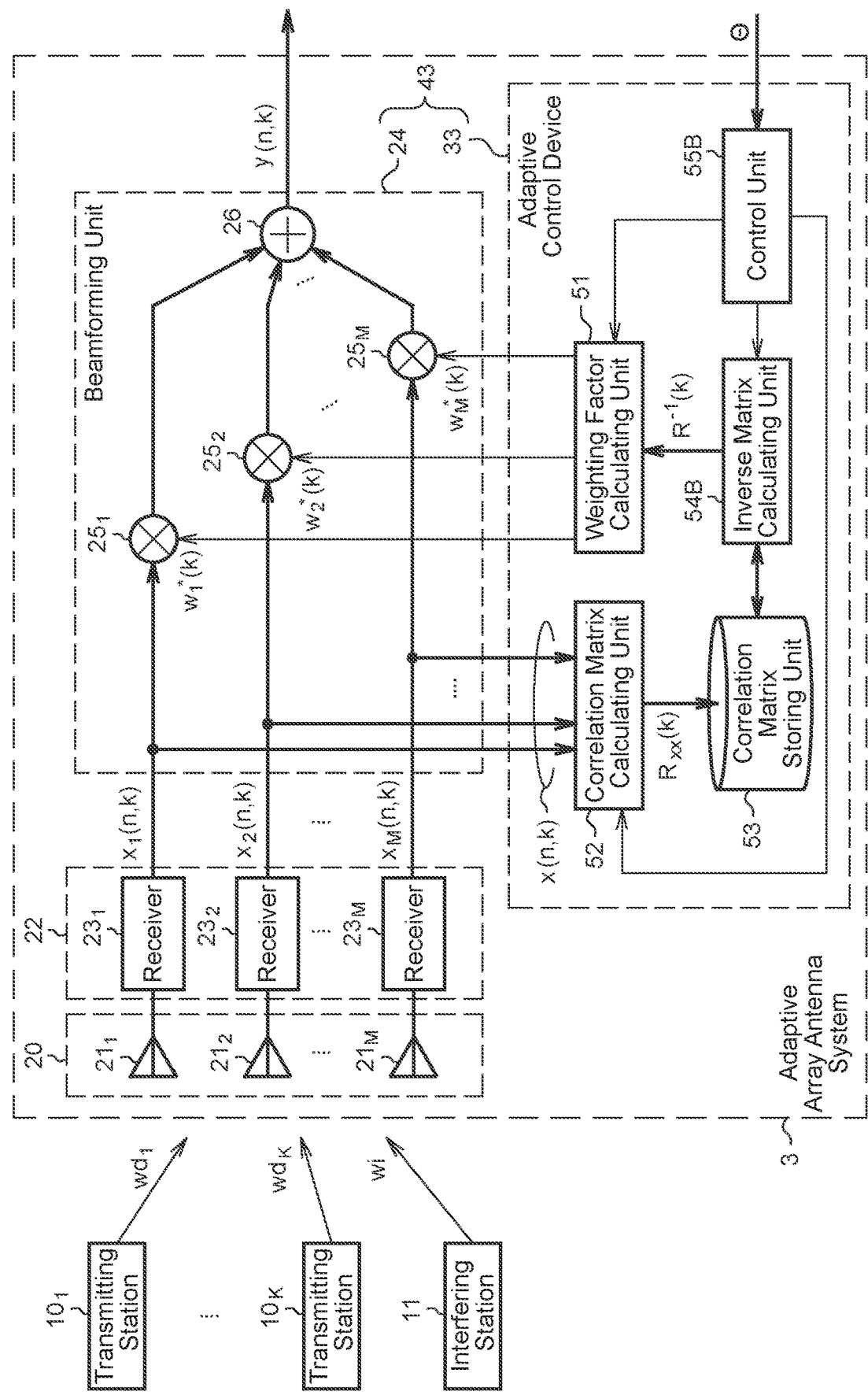
FIG. 15 is a diagram illustrating a schematic configuration of an adaptive array antenna system according to a third embodiment of the present invention.

Next, a third embodiment according to the present invention will be described. FIG. 15 is a diagram illustrating a schematic configuration of an adaptive array antenna system 3 according to the third embodiment of the present invention.

The configuration of the adaptive array antenna system 3 of the present embodiment is the same as the configuration of the adaptive array antenna system 1 of the first embodiment except that an adaptive control device 33 of FIG. 15 is included instead of the adaptive control device 31 of the first embodiment. In addition, the configuration of the adaptive control device 33 of the present embodiment is the same as the configuration of the adaptive control device 31 of the first embodiment except that an inverse matrix calculating unit 54B and a control unit 55B of FIG. 15 are included instead of the inverse matrix calculating unit 54 and the control unit 55 of the first embodiment. The control unit 55B has been provided with data Θ in assumed directions of arrival $\theta_1$ to $\theta_M$ from an external device (not illustrated) and can control the operation of the weighting factor calculating unit 51, the correlation matrix calculating unit 52, and the inverse matrix calculating unit 54B by using the data Θ. An adaptive signal processing device 43 of the present embodiment includes the beamforming unit 24 and the adaptive control device 33.

For receiving the desired wave through the time slot Ts(k) at the current time, the inverse matrix calculating unit 54B of the present embodiment acquires, from the correlation matrix storing unit 53, a plurality of correlation matrices calculated at previous time for a plurality of time slots and calculates an inverse matrix $R^{-1}(k)$ of the interference noise correlation matrix by regarding an average matrix of the plurality of correlation matrices that has been acquired as the interference noise correlation matrix.

Figure 16:
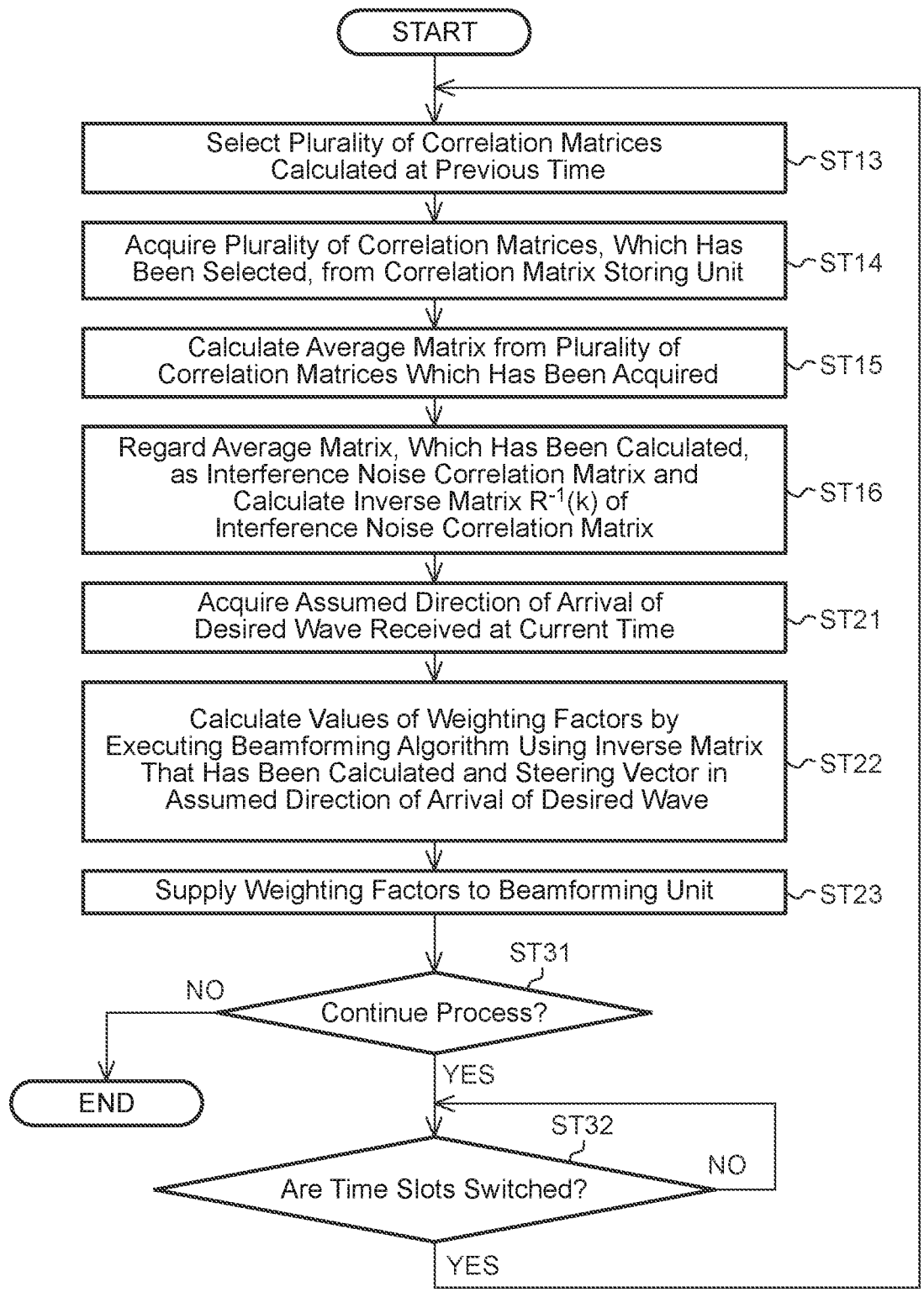
FIG. 16 is a flowchart schematically illustrating an example of a process procedure performed by an inverse matrix calculating unit and a weighting factor calculating unit of the third embodiment.

The operation of the inverse matrix calculating unit 54B will be described with reference to FIG. 16. FIG. 16 is a flowchart schematically illustrating an example of a process procedure performed by the inverse matrix calculating unit 54B and the weighting factor calculating unit 51 of the third embodiment. The flowchart of FIG. 16 is the same as the flowchart of FIG. 4 except that steps ST13 to ST16 of FIG. 16 are included instead of steps ST10 to ST12 of FIG. 4.

Referring to FIG. 16, in step ST13, the inverse matrix calculating unit 54B selects a plurality of correlation matrices having been calculated at previous time (step ST13) and acquires the plurality of correlation matrices, which has been selected, from the correlation matrix storing unit 53 (step ST14).

Next, the inverse matrix calculating unit 54B calculates an average matrix $E_{xx}$ from the plurality of correlation matrices acquired in step ST14 (step ST15). The inverse matrix calculating unit 54B can calculate the average matrix $E_{xx}$ according to the following equation (34), for example.

$$E_{xx} = \frac{1}{K}\sum_{k=1}^{K} R_{xx}(k) \qquad (34)$$

After step ST15, the inverse matrix calculating unit 54B regards the average matrix $E_{xx}$ as the interference noise correlation matrix and calculates an inverse matrix of the average matrix $E_{xx}$ as an inverse matrix $R^{-1}(k)$ of the interference noise correlation matrix (step ST16). Then, as in the case of the first embodiment, steps ST21 to ST23, ST31, and ST32 are executed.

The direction of arrival of a desired wave varies for every time slot, whereas the direction of arrival of an interfering wave such as an interference wave is often substantially constant. Therefore, after the averaging process in step ST15, the disturbance wave power in the correlation matrix is similar to that before averaging, whereas the desired wave power becomes 1/K times. In a case where the number of transmitting stations K is sufficiently large, the ratio of the desired wave power at the current time in the average matrix $E_{xx}$ decreases. By executing a beamforming algorithm similar to that of the first embodiment using an inverse matrix of the average matrix $E_{xx}$ as the above, it is possible to efficiently suppress an interfering wave without suppressing the desired wave.

In addition, from the viewpoint of avoiding suppression of the desired wave as much as possible, it is desirable to exclude the correlation matrix calculated for the current time slot from the averaging process in step ST15.

As described above, the adaptive array antenna system 3 of the third embodiment acquires the plurality of correlation matrices having been calculated at previous time from the correlation matrix storing unit 53 and uses an inverse matrix of an average matrix of the plurality of correlation matrices that has been acquired by regarding the inverse matrix as an inverse matrix of the interference noise correlation matrix. Therefore, even when an error occurs in the steering vector in an assumed direction of arrival of a desired wave at the current time, the adaptive array antenna system 3 can perform beamforming while suppressing deterioration of the communication quality without reducing the communication throughput.

Fourth Embodiment

Figure 17:
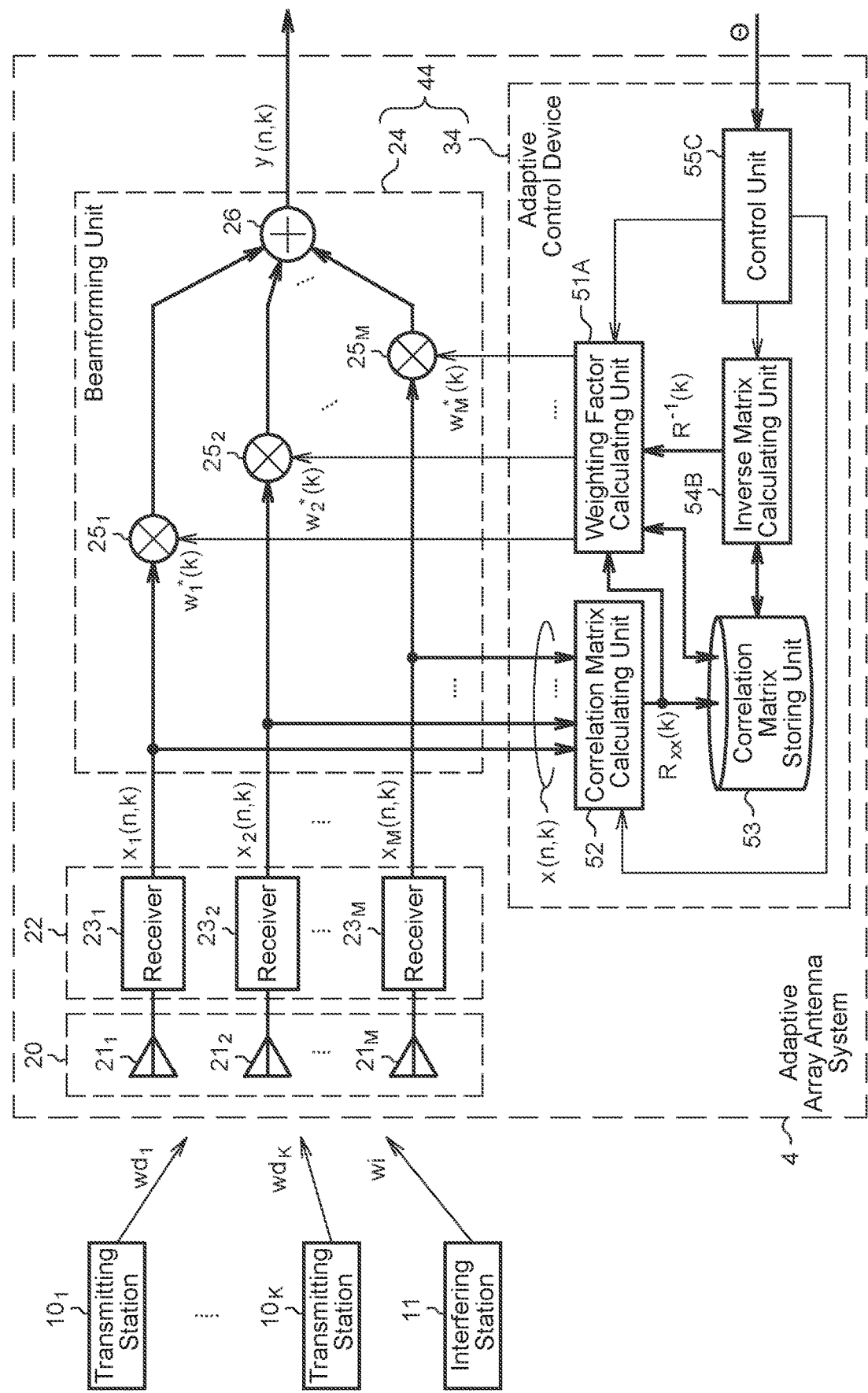
FIG. 17 is a diagram illustrating a schematic configuration of an adaptive array antenna system according to a fourth embodiment of the present invention.

Next, a fourth embodiment according to the present invention will be described. FIG. 17 is a diagram illustrating a schematic configuration of an adaptive array antenna system 4 according to a fourth embodiment of the present invention.

The configuration of the adaptive array antenna system 4 of the present embodiment is the same as the configuration of the adaptive array antenna system 3 of the third embodiment except that an adaptive control device 34 of FIG. 17 is included instead of the adaptive control device 33 of the third embodiment. In addition, the configuration of the adaptive control device 34 of the present embodiment is the same as the configuration of the adaptive control device 33 of the third embodiment except that a weighting factor calculating unit 51A and a control unit 55C of FIG. 17 are included instead of the weighting factor calculating unit 51 and the control unit 55B of the third embodiment. The control unit 55C has been provided with data $\Theta$ in assumed directions of arrival $\theta_1$ to $\theta_M$ from an external device (not illustrated) and can control the operation of the weighting factor calculating unit 51A, the correlation matrix calculating unit 52, and an inverse matrix calculating unit 54B by using the data $\Theta$. An adaptive signal processing device 44 of the present embodiment includes a beamforming unit 24 and the adaptive control device 34.

Figure 18:
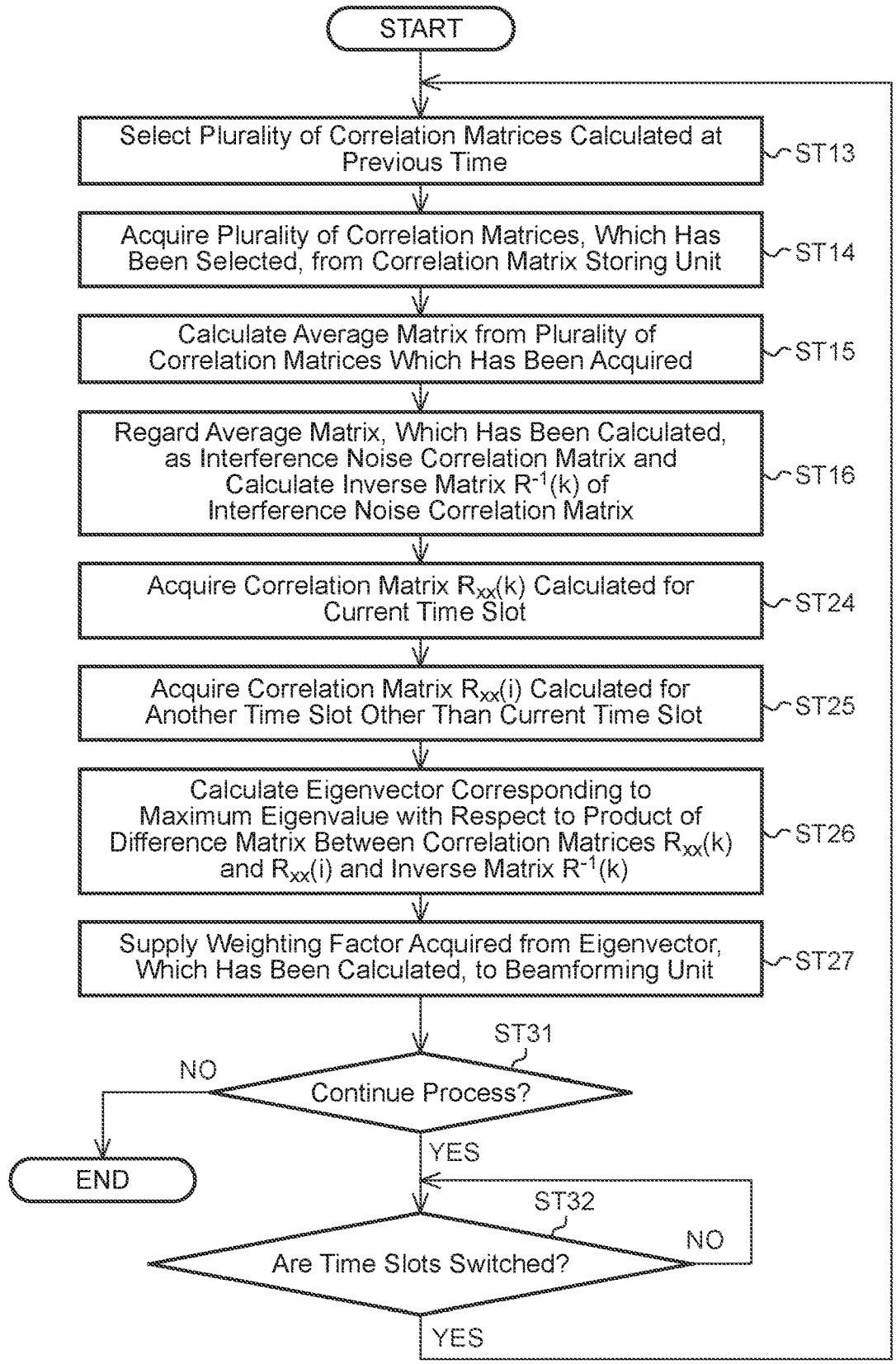
FIG. 18 is a flowchart schematically illustrating an example of a process procedure performed by an inverse matrix calculating unit and a weighting factor calculating unit of the fourth embodiment.

The configuration of the weighting factor calculating unit 51A in FIG. 17 is the same as the configuration of the weighting factor calculating unit 51A of the second embodiment. FIG. 18 is a flowchart schematically illustrating an example of a process procedure performed by the inverse matrix calculating unit 54B and the weighting factor calculating unit 51A of the fourth embodiment. The flowchart of FIG. 18 includes a combination of steps ST13 to ST16 of FIG. 16 and steps ST24 to ST27, ST31, and ST32 of FIG. 14. Therefore, in the present embodiment, the inverse matrix calculating unit 54B regards an inverse matrix of an average matrix as an inverse matrix of the interference noise correlation matrix and uses the inverse matrix as in the third embodiment. In addition, similarly to the second embodiment, the weighting factor calculating unit 51A calculates weighting factors $w_1^*(k)$ to $w_M(k)$ using the inverse matrix. Therefore, even when an error occurs in the steering vector in an assumed direction of arrival of a desired wave at the current time, the adaptive array antenna system 4 of the present embodiment can perform beamforming while suppressing deterioration of the communication quality without reducing the communication throughput.

Although the first to fourth embodiments according to the present invention have been described with reference to the drawings, the first to fourth embodiments are examples of the present invention, and thus various embodiments other than the first to fourth embodiments can also be adopted. Within the scope of the present invention, the present invention may include a flexible combination of the first to fourth embodiments, a modification of any component of the embodiments, or omission of any component in the embodiments.

For example, as in the case of the first embodiment, all or some of the functions of the adaptive signal processing device of one of the second to fourth embodiments can be implemented by a single or a plurality of processors having a semiconductor integrated circuit such as a DSP, an ASIC, or a PLD. Alternatively, all or some of the functions of the adaptive signal processing device may be implemented by a single or a plurality of processors including an arithmetic device such as a CPU or a GPU that executes program codes of software or firmware. Further alternatively, all or some of the functions of the adaptive signal processing device can be implemented by a single or a plurality of processors including a combination of a semiconductor integrated circuit such as a DSP, an ASIC, or a PLD and an arithmetic device such as a CPU or a GPU. The hardware configuration of the adaptive signal processing device may be implemented by the signal processing circuit 70 illustrated in FIG. 12.

INDUSTRIAL APPLICABILITY

An adaptive control device, an adaptive signal processing device, and an adaptive array antenna system according to the present invention are applicable to, for example, mobile communication technology or satellite communication technology.

REFERENCE SIGNS LIST

1 to 4: adaptive array antenna system, $10_1$ to $10_K$: transmitting station, 11: interfering station, 20: antenna array, $21_1$ to $21_M$: antenna element, 22: reception circuit, $23_1$ to $23_M$: receiver, 24: beamforming unit, $25_1$ to $2_M$: multiplier, 26: combiner, 31 to 34: adaptive control device, 41 to 44: adaptive signal processing device, 51, 51A: weighting factor calculating unit, 52: correlation matrix calculating unit, 53: correlation matrix storing unit, 54, 54B: inverse matrix calculating unit, 55, 55A, 55B, 55C: control unit, 70: signal processing circuit, 71: processor, 72: memory, 73: storage device, 74: input and output interface circuit, 75: signal path

The invention claimed is:

1. An adaptive control device to adaptively control directivity of an antenna array in an adaptive array antenna system including: an antenna array including a plurality of antenna elements to receive a desired wave arriving through K time slots each allocated to one of K transmitting stations (K is an integer greater than or equal to 2); a reception circuit to generate a plurality of reception signals by performing signal processing on a plurality of antenna signals output in parallel from the plurality of respective antenna elements; and a beamformer to generate a plurality of weighted signals by weighting the plurality of reception signals each of a plurality of weighting factors and generate a combined signal by combining the plurality of weighted signals, the adaptive control device comprising:

processing circuitry configured to calculate a correlation matrix of the plurality of reception signals for each of the K time slots;

store the correlation matrix that has been calculated;

in a case where the antenna array receives a desired wave through a current time slot that is any one of the K time slots at current time, acquire a correlation matrix that has been calculated at previous time for another time slot other than the current time slot among the K time slots, regard the acquired correlation matrix as an interference noise correlation matrix, and calculate an inverse matrix of the interference noise correlation matrix; and calculate the plurality of weighting factors using the inverse matrix.

2. The adaptive control device according to claim 1, wherein the processing circuitry stores K correlation matrices corresponding to the respective K time slots, and the processing circuitry selects the interference noise correlation matrix from the K correlation matrices so as to satisfy a condition that a magnitude of a difference in directions of arrival between an assumed direction of arrival of the desired wave received through the current time slot and an assumed direction of arrival of the desired wave received at the previous time through said another time slot exceeds a threshold value.

3. The adaptive control device according to claim 1,
wherein the processing circuitry stores K correlation matrices corresponding to the respective K time slots, and
the processing circuitry selects the interference noise correlation matrix from the K correlation matrices so as to satisfy the condition that a magnitude of a difference in directions of arrival between an assumed direction of arrival of the desired wave received through the current time slot and an assumed direction of arrival of the desired wave received at the previous time through said another time slot is maximized.

4. The adaptive control device according to claim 1, wherein the processing circuitry calculates the plurality of weighting factors by executing a beamforming algorithm that maximizes a signal-to-interference-plus-noise power ratio using the inverse matrix and a steering vector in the assumed direction of arrival of the desired wave received through the current time slot.

5. The adaptive control device according to claim 4, wherein the beamforming algorithm is a minimum variance and distortionless response beamforming algorithm.

6. The adaptive control device according to claim 1,
wherein the processing circuitry calculates a correlation matrix of the plurality of reception signals for the current time slot as a first correlation matrix, and
the processing circuitry acquires a correlation matrix calculated at previous time for another time slot other than the current time slot among the K time slots as a second correlation matrix, calculates an eigenvector corresponding to a maximum eigenvalue for a product of a difference matrix between the first and second correlation matrices and the inverse matrix, and calculates the plurality of weighting factors from the eigenvector.

7. An adaptive signal processing device comprising:
the adaptive control device according to claim 1; and
the beamformer.

8. An adaptive array antenna system comprising:
the adaptive signal processing device according to claim 7;
the antenna array; and
the reception circuit.

9. An adaptive control device to adaptively control directivity of an antenna array in an adaptive array antenna system including: an antenna array including a plurality of antenna elements to receive a desired wave arriving through K time slots each allocated to one of K transmitting stations (K is an integer greater than or equal to 2); a reception circuit to generate a plurality of reception signals by performing signal processing on a plurality of antenna signals output in parallel from the plurality of respective antenna elements; and a beamformer to generate a plurality of weighted signals by weighting the plurality of reception signals with each of a plurality of weighting factors and generate a combined signal by combining the plurality of weighted signals, the adaptive control device comprising:
processing circuitry configured to
calculate a correlation matrix of the plurality of reception signals for each of the K time slots;
store the correlation matrix that has been calculated;
in a case where the antenna array receives a desired wave through a current time slot that is any one of the K time slots at current time, acquire a plurality of correlation matrices that has been calculated at previous time for a plurality of time slots among the K time slots, regard an average matrix of the plurality of correlation matrices, which has been acquired, as an interference noise correlation matrix, and calculate an inverse matrix of the interference noise correlation matrix; and
calculate the plurality of weighting factors using the inverse matrix.

10. The adaptive control device according to claim 9, wherein the plurality of time slots does not include the current time slot.

11. The adaptive control device according to claim 9, wherein the processing circuitry calculates the plurality of weighting factors by executing a beamforming algorithm that maximizes a signal-to-interference-plus-noise power ratio using the inverse matrix and a steering vector in the assumed direction of arrival of the desired wave received through the current time slot.

12. The adaptive control device according to claim 11, wherein the beamforming algorithm is a minimum variance and distortionless response beamforming algorithm.

13. The adaptive control device according to claim 9,
wherein the processing circuitry calculates a correlation matrix of the plurality of reception signals for the current time slot as a first correlation matrix, and
the processing circuitry acquires a correlation matrix calculated at previous time for another e slot other than the current time slot among the K time slots as a second correlation matrix, calculates an eigenvector corresponding to a maximum eigenvalue for a product of a difference matrix between the first and second correlation matrices and the inverse matrix, and calculates the plurality of weighting factors from the eigenvector.

* * * * *